United States Patent
Korchev et al.

(10) Patent No.: US 9,790,393 B2
(45) Date of Patent: Oct. 17, 2017

(54) COATINGS HAVING FILLER-POLYMER COMPOSITIONS WITH COMBINED LOW DIELECTRIC CONSTANT, HIGH RESISTIVITY, AND OPTICAL DENSITY PROPERTIES AND CONTROLLED ELECTRICAL RESISTIVITY, DEVICES MADE THEREWITH, AND METHODS FOR MAKING SAME

(71) Applicant: Cabot Corporation, Boston, MA (US)

(72) Inventors: Andriy Korchev, Westford, MA (US); Jeremy K. Huffman, Amarillo, TX (US); Agathagelos Kyrlidis, Cambridge, MA (US); Pavel A. Kossyrev, Providence, RI (US); Eugene N. Step, Newton, MA (US); Geoffrey D. Moeser, Groton, MA (US); Qingling Zhang, Bloomfield Hills, MI (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/771,846

(22) PCT Filed: Mar. 12, 2014

(86) PCT No.: PCT/US2014/024562
§ 371 (c)(1),
(2) Date: Sep. 1, 2015

(87) PCT Pub. No.: WO2014/165151
PCT Pub. Date: Oct. 9, 2014

(65) Prior Publication Data
US 2016/0017168 A1  Jan. 21, 2016

Related U.S. Application Data

(60) Provisional application No. 61/779,466, filed on Mar. 13, 2013.

(51) Int. Cl.
| | |
|---|---|
| C09D 133/06 | (2006.01) |
| C09D 5/00 | (2006.01) |
| C09D 7/00 | (2006.01) |
| B05D 3/06 | (2006.01) |
| C08K 3/04 | (2006.01) |
| C08K 3/36 | (2006.01) |

(52) U.S. Cl.
CPC .......... *C09D 133/06* (2013.01); *B05D 3/067* (2013.01); *C08K 3/04* (2013.01); *C08K 3/36* (2013.01); *C09D 5/00* (2013.01); *C09D 7/00* (2013.01); *C08K 2003/045* (2013.01)

(58) Field of Classification Search
None
See application file for complete search history.

(56) References Cited

U.S. PATENT DOCUMENTS

| | | |
|---|---|---|
| 2,833,736 A | 5/1958 | Glaser |
| 3,607,813 A | 9/1971 | Purcell et al. |
| 4,104,833 A | 8/1978 | Glowacki |
| 4,308,061 A | 12/1981 | Inoue |
| 4,692,481 A | 9/1987 | Kelly |
| 4,770,706 A | 9/1988 | Pietsch |
| 5,026,755 A | 6/1991 | Catena et al. |
| 5,051,464 A | 9/1991 | Johnson et al. |
| 5,204,404 A | 4/1993 | Konsza |
| 5,266,361 A | 11/1993 | Poth et al. |
| 5,266,406 A | 11/1993 | Den Hartog et al. |
| 5,275,900 A | 1/1994 | Martins et al. |
| 5,278,018 A | 1/1994 | Hyland |
| 5,314,945 A | 5/1994 | Nickle |
| 5,319,044 A | 6/1994 | Jung et al. |
| 5,356,973 A | 10/1994 | Hartman |
| 5,484,575 A | 1/1996 | Steenackers |
| 5,510,221 A | 4/1996 | Cortash et al. |
| 5,571,654 A | 11/1996 | Ong |
| 5,622,557 A | 4/1997 | Belmont et al. |
| 5,747,562 A | 5/1998 | Adams et al. |
| 5,749,950 A | 5/1998 | Adams et al. |
| 5,830,930 A | 11/1998 | Francis et al. |
| 5,859,120 A | 1/1999 | Freund et al. |
| 5,863,323 A | 1/1999 | Belmont et al. |

(Continued)

FOREIGN PATENT DOCUMENTS

| | | |
|---|---|---|
| EP | 0459464 B1 | 4/1996 |
| EP | 0720066 A1 | 7/1996 |

(Continued)

OTHER PUBLICATIONS

Mayer et al. Photohydrosilylation reaction of silicone polymers. Platinum-based photocatalysts: Trimethyl(β-dicarbonyl) platinum IV complexes. vol. 34, Issue 15, Nov. 15, 1996 , pp. 3141-3146.*
Notification of Transmittal of the International Search Report and the Written Opinion of the International Searching Authority, or the Declaration of International Patent Application No. PCT/US2014/024562, dated Sep. 4, 2014.
Notification of Transmittal of the International Preliminary Report on Patentability of International Patent Application No. PCT/US2014/024562, dated Mar. 20, 2015.
Calame, "Evolution of Davidson—Cole relaxation behavior in random conductor—insulator composites," J. Appl. Physics, 94(9), 5945-5957 (2003).
Wang, et al., "New Generation Carbon-Silica Dual Phase Filler Part I. Characterization and Application to Passenger Tire," Rubber Chemistry and Technology, 75, 247-263 (2001).

(Continued)

*Primary Examiner* — Sanza McClendon

(57) ABSTRACT

UV curable coatings containing dual phase filler-polymer compositions with high resistivity, low dielectric constant, good optical density, and controlled electrical resistivity are described, and cured coatings or films formed thereof, along with their use in black matrix, black column spacers, and other light shielding coating elements in LCD. Devices having these black matrices, black column spacers, and/or other light shielding coating elements, and methods of preparing and making these various materials and products are also described.

13 Claims, 10 Drawing Sheets

(56) References Cited

U.S. PATENT DOCUMENTS

| | | |
|---|---|---|
| 5,869,550 A | 2/1999 | Mahmud et al. |
| 5,877,238 A | 3/1999 | Francis et al. |
| 5,904,762 A | 5/1999 | Mahmud et al. |
| 5,919,841 A | 7/1999 | Francis et al. |
| 5,948,835 A | 9/1999 | Francis et al. |
| 5,977,213 A | 11/1999 | Mahmud et al. |
| 5,977,238 A | 11/1999 | Labauze |
| 6,008,272 A | 12/1999 | Francs et al. |
| 6,028,137 A | 2/2000 | Belmont et al. |
| 6,057,387 A | 5/2000 | Mahmud et al. |
| 6,068,688 A | 5/2000 | Whitehouse et al. |
| 6,071,995 A | 6/2000 | Labauze |
| 6,169,129 B1 | 1/2001 | Mahmud et al. |
| 6,172,154 B1 | 1/2001 | Brown et al. |
| 6,191,184 B1 | 2/2001 | Suzuki et al. |
| 6,211,279 B1 | 4/2001 | Mahmud et al. |
| 6,323,273 B1 | 11/2001 | Mahmud et al. |
| 6,331,586 B1 | 12/2001 | Thielen et al. |
| 6,364,944 B1 | 4/2002 | Mahmud et al. |
| 6,391,274 B1 | 5/2002 | Vogler et al. |
| 6,448,309 B2 | 9/2002 | Mahmud et al. |
| 6,458,882 B1 | 10/2002 | Pyle et al. |
| 6,469,089 B2 | 10/2002 | Wang et al. |
| 6,476,115 B1 | 11/2002 | Wideman |
| 6,534,569 B2 | 3/2003 | Mahmud et al. |
| 6,686,409 B2 | 2/2004 | Mahmud et al. |
| 6,709,506 B2 | 3/2004 | Mahmud et al. |
| 6,929,783 B2 | 8/2005 | Chung et al. |
| 7,199,176 B2 | 4/2007 | Mahmud et al. |
| 7,655,372 B2 | 2/2010 | Step et al. |
| 7,776,602 B2 | 8/2010 | Brown et al. |
| 7,776,603 B2 | 8/2010 | Brown et al. |
| 7,776,604 B2 | 8/2010 | Brown et al. |
| 2002/0027110 A1 | 3/2002 | Belmont et al. |
| 2003/0138733 A1 | 7/2003 | Sachdev et al. |
| 2005/0203202 A1 | 9/2005 | Ramsey |
| 2006/0084751 A1 | 4/2006 | Step et al. |
| 2008/0159947 A1 | 7/2008 | Green et al. |
| 2010/0069568 A1 | 3/2010 | Kiesekamp |
| 2011/0005063 A1 | 1/2011 | Lee et al. |
| 2013/0158164 A1 | 6/2013 | Morris et al. |
| 2013/0165560 A1 | 6/2013 | Belmont et al. |
| 2013/0273468 A1 | 10/2013 | Korchev et al. |

FOREIGN PATENT DOCUMENTS

| | | |
|---|---|---|
| EP | 1043178 A1 | 10/2000 |
| EP | 2495285 A1 | 9/2012 |
| JP | S58-145178 A | 8/1983 |
| JP | H09-296072 A | 11/1997 |
| JP | H11-505879 | 5/1999 |
| JP | 2000-289411 A | 10/2000 |
| JP | 2000-351903 | 12/2000 |
| JP | 200140145 A | 2/2001 |
| JP | 2001-089598 | 4/2001 |
| JP | 2001-139730 | 5/2001 |
| JP | 2001263333 A | 9/2001 |
| JP | 2002-055520 | 2/2002 |
| JP | 2002-121308 | 4/2002 |
| WO | WO96/37547 | 11/1996 |
| WO | WO 2008/102990 A1 | 8/2008 |
| WO | WO 2012/051264 A1 | 4/2012 |
| WO | WO 2012/082484 A2 | 6/2012 |

OTHER PUBLICATIONS

Zhang, et al., "Carbon-Silica Dual Phase Filler Application to Passenger Tread Compounds," Rubber World, 43-55 (Apr. 2002).

Wang, et al., "Carbon-Silica Dual Phase Filler, a New Generation Reinforcing Agent for Rubber Part I. Characterization," KGK Kautschuk Gummi Kunststoffe 51., May 1998, pp. 348-360, XP-00766427.

Wang, et al., "Carbon-Silica Dual Phase Filler, A New Generation Reinforcing Agent for Rubber: Part VIII. Surface Characterization by IGC," Rubber Chemistry and Technology, Sep./Oct. 2000, vol. 73, Issue 4, pp. 666-667.

Wang, et al., "Carbon-Silica Dual-Phase Filler, A New Generation Reinforcing Agent for Rubber. Part VI. Time-Temperature Superposition of Dynamic Properties of Carbon-Silica-Dual-Phase-Filler-Filled Vulcanizates," Journal of Polymer Science, Part B, vol. 38, pp. 1240-1249, 2000.

U.S. Appl. No. 13/912,258, filed Jun. 7, 2013, Pending.

Extended European Search Report of EP Application No. 11849776. 7, dated Dec. 11, 2015.

Japanese Office Action dated Sep. 30, 2016 in corresponding Japanese Patent Application No. 2015-178473 (in Japanese with English translation attached) (11 pages).

* cited by examiner

COATINGS HAVING FILLER-POLYMER COMPOSITIONS WITH COMBINED LOW DIELECTRIC CONSTANT, HIGH RESISTIVITY, AND OPTICAL DENSITY PROPERTIES AND CONTROLLED ELECTRICAL RESISTIVITY, DEVICES MADE THEREWITH, AND METHODS FOR MAKING SAME

This application is a §371 national phase application of International Patent Application No. PCT/US2014/024562, filed on Mar. 12, 2014, which claims the benefit under 35 U.S.C. §119(e) of prior U.S. Provisional Patent Application No. 61/779,466, filed Mar. 13, 2013.

BACKGROUND OF THE INVENTION

The present invention relates to coatings containing fillers and fillers in filler-polymer compositions. The present invention further relates to ultraviolet (UV) light curable coatings, and cured coatings or films formed therefrom, containing filler-polymer compositions with low dielectric constant, high resistivity, and good optical density properties, and controlled electrical resistivity. The present invention further relates to black matrices containing filler-polymer compositions with low dielectric constant, high resistivity, and good optical density properties, and controlled electrical resistivity. The present invention further relates to black column spacers containing filler-polymer compositions with low dielectric constant, high resistivity, and good optical density properties, and controlled electrical resistivity. The present invention further relates to light shielding coating elements for LCD devices containing filler-polymer compositions with low dielectric constant, high resistivity, and good optical density properties, and controlled electrical resistivity. The present invention also relates to devices having these black matrices, black column spacers, and light shielding coating elements. The present invention further relates to methods of preparing and making these various materials and products.

Black matrix is a generic name for materials used in color displays to improve the contrast of an image by separating individual color pixels. Electric color display devices convert electric information into images. In liquid crystal displays (LCDs), the black matrix can be a thin film having high light-shielding capability and can be formed between the three color elements of a color filter. One conventional LCD device is a thin film transistor liquid crystal display (TFT-LCD). In LCD's using thin film transistors (TFT), the black matrix also can prevent the formation of photo-induced currents due to reflected light in the TFT. Color filter on array (COA) technology also has been developed in which a COA-TFT substrate of a LCD device is provided. Some developments in color filter on array technology are shown, for example, in U.S. Pat. Nos. 7,773,177; 7,439,090 B2; 7,436,462 B2; and 6,692,983 B1; and U.S. Patent Application Publication No. 2007/0262312 A1. Black matrixes, for example, have been patterned on a thin film transistor (TFT) array substrate of a color filter on array (COA)-TFT structure to define regions where red, green, and blue filter layers are formed to provide a color filter on the TFT array substrate. An ink jetting process also has been used in the manufacture of a color filter of an LCD. In one form of ink jetting process, a light-shielding layer such as a black matrix has been formed on a glass substrate component of a color filter structure, and the black matrix undergoes exposure and development processing to form a pixel area on the black matrix. Black matrix compositions also have been provided as photocurable compositions, such as photoresistive compositions.

A LCD device requires internal spacers to maintain a cell gap defined by a thickness of the liquid crystal layer. Ball spacers can be used to maintain the spacing. The ball spacers have a spherical form and can move in the gap they provide between two substrates. In a different design, column spacers can be used to maintain a constant gap for liquid crystal layer in LCD device. Unlike ball spacers, the column spacers are immobile. The layer of column spacer is generally preformed through a lithographic process similar to black matrix on the first or second substrate. The curable composition to make column spacers can be pigmented with particles such as carbon black. Such a spacer design is called a black column spacer. Since the column spacers have fixed position, they can be used as a light shielding element, particularly black column spacers.

In making filler-polymer compositions, there is a desire to have certain electrical resistivity, such as surface resistivity and/or volume resistivity, in the filler-polymer composition for various uses, such as black matrices, black column spacers or other light shielding coating elements in LCD. The desired range of electrical volume (or surface) resistivity depends on a particular application and, for example, can be in the range of from $10^1$ to $10^{18}$ Ohm*cm. A typical volume resistivity value for some commercial polymers is in the range of from $10^{12}$ to $10^{18}$ Ohm*cm. Conductive filler with good extinction coefficient, such as carbon black, is frequently added to lower electrical resistivity of particle-polymer composition and/or to provide good light shielding properties. A sharp change in resistivity of the composite happens when the concentration of carbon particles reaches a critical value at which continuous conductive paths are formed.

Black pigments such as carbon black have been used in polymer compositions to make resistive black matrices or other light shielding coating elements in LCD. However, typical systems may not be able to provide the desired balance of overall properties, such as with respect to the required light-shielding capabilities (e.g., an optical density (OD) of greater than 3 at 1 micron thickness) and resistivity. Modified pigments having attached organic groups have also been disclosed for use in a black matrix for color filters. For example, U.S. Patent Application Publication No. 2003-0129529 A1 relates, in part, to a black matrix prepared using a pigment having attached at least one polymeric group, wherein the polymeric group comprises at least one photopolymerizable group and at least one ionic or ionizable group. Also, U.S. Patent Application Publication No. 2002-0020318 A1 relates, in part, to a black matrix prepared using a pigment having attached at least one organic ionic group and at least one amphiphilic counterion. In addition, U.S. Patent Application Publication No. 2002-0011185 A1 relates, in part, to black matrix prepared using a photosensitive coating comprising solvent and pigment having attached at least one alkylene or alkyl group having 50-200 carbons.

The resistivity of compositions or composites can be affected by chemical functionalization of the carbon black, for instance, by use of diazonium chemistry, where an alkyl-containing or aromatic-containing group is attached onto the carbon black. U.S. Published Patent Application No. 2006/0084751 A1 provides some examples of certain types of chemical functionalizations of the carbon surface via diazonium chemistry with non-polymeric organic groups. While this chemical functionalization has been quite useful and an important advancement in filler-polymer compositions, the chemical functionalization of carbon black can have a disadvantage in that the chemical organic groups attached onto the surface of the carbon black are sensitive to high temperatures. For instance, at temperatures above 150° C., the chemical groups attached onto the carbon black may be destroyed, which can lead to the loss of resistivity performance. Some filler-polymer compositions are made or are preferably made in high temperature processing or subjected to high temperatures in post-processing. In some processes for preparation of a black matrix, for instance, a coating film containing chemical-functionalized carbon black is exposed to an elevated temperature (e.g., a baking step for a coating). It would be helpful to have alternative solutions to controlling electrical resistivity in filler-polymer compositions for black matrices and other applications which are less sensitive to high temperature processing, and therefore, can provide more robust manufacturing process.

Further, it would also be desirable to have a filler which can permit control of electrical resistivity and dielectric constant in a polymer composition and provide good light shielding properties in various applications, such as in black matrices, black column spacers or other light shielding coating elements in LCD. In semiconductor manufacturing, a low-k dielectric is a material with small dielectric constant relative to silicone dioxide. The dielectric constant of $SiO_2$, an insulating material commonly used in silicon chips, can be about 3.9. Carbon black itself typically has a significantly higher dielectric constant than silica. As indicated, the COA designs include the black matrix that can be directly coated on a thin film transistor (TFT). Such arrangement, although beneficial to improve aperture size and increase energy efficiency, may cause poor performance of a LCD device due to signal interference between the thin film transistor, the gate line or the data line. For example, U.S. Pat. No. 7,773,177 discusses the nature of parasitic capacitance induced in COA and relates the issue to the black matrices having high dielectric constant. The COA-TFT configuration necessitates materials for the black matrix that show low dielectric constant to prevent capacitive interference and signal delays. Additionally, the black matrix layer needs to be very resistive, but the optical density requirement for the layer is reduced since COA-TFT can utilize the black matrix with larger thickness than in the conventional design. Optical density in the range of 1-2 per micron layer thickness is targeted for COA-TFT configuration.

Further, as has been mentioned above, a LCD device requires internal spacers to maintain a constant cell gap for the liquid crystal layer. Since ball spacers are randomly distributed between the first and second substrates, the quality of an alignment layer may be lowered due to movement of the ball spacers. Moreover, a uniform cell gap may not be obtained in a large sized LCD device with ball spacers. Furthermore, since the ball spacers are elastic and do not remain at a fixed position, a severe ripple phenomenon may occur when the LCD device is touched. Thus, superior display quality cannot be obtained in the LCD device when a uniform cell gap is maintained using ball spacers. On the other hand, a uniform cell gap can be obtained using patterned spacers. In addition, the patterned spacers may be applied to an LCD device to form a small cell gap since the patterned spacers can be controlled precisely. Furthermore, since the patterned spacers are fixed, they may be easily applied to large sized LCD devices and the ripple phenomenon may be prevented when the LCD device is touched. When a black column spacer is used, it is important to maintain a high electrical resistivity and low dielectric constant for the spacer composition since the electric field can be distorted if more conductive and/or high dielectric materials are present near the electrodes and thin film transistors. This will lead to the poor quality operation of the LCD device. Generally, the dielectric constant of black column spacers should be less than 20, preferably less than 10, more preferably, less than 5.

Accordingly, there is a need to overcome the disadvantages mentioned above and to provide filler-polymer compositions useful for forming black matrices, black column spacers or other light shielding coating elements in LCD with good overall performance which can exhibit combinations of high resistivity, low dielectric constant, acceptable optical density properties, and controllable electrical properties in order to achieve desired resistivity and dielectric constant ranges, and particularly methods which are not dependent on the chemical functionalization of conductive filler particles alone or at all.

SUMMARY OF THE PRESENT INVENTION

A feature of the present invention is to provide UV curable coatings which contain filler-polymer compositions which have combinations of high resistivity, low dielectric constant, and acceptable optical density properties, and controlled electrical properties.

A further feature of the present invention is to provide cured coatings or films which contain filler-polymer compositions which have combinations of high resistivity, low dielectric constant, and acceptable optical density properties, and controlled electrical properties.

A further feature of the present invention is to provide black matrices which contain filler-polymer compositions which have combinations of high resistivity, low dielectric constant, and acceptable optical density properties, and controlled electrical properties.

A further feature of the present invention is to provide black column spacers which contain filler-polymer compositions which have combinations of high resistivity, low dielectric constant, and acceptable optical density properties, and controlled electrical properties.

A further feature of the present invention is to provide light shielding coating elements in a LCD which contain filler-polymer compositions which have combinations of high resistivity, low dielectric constant, and acceptable optical density properties, and controlled electrical properties.

A further feature of the present invention is to provide methods for making UV-curable coatings, black matrices, black column spacers and other light shielding coating elements in a LCD which contain filler-polymer compositions that can maintain good thermal stability, and controlled electrical resistivity and dielectric constant, in the filler-polymer compositions when exposed to elevated temperature for preparation or post-processing.

A further feature of the present invention is to provide UV-curable coatings, black matrices, black column spacers and other light shielding coating elements in a LCD which contain a filler-polymer composition, wherein the electrical resistivity is consistent across a large range of filler loadings.

Another feature of the present invention is to provide devices which incorporate the UV-curable coatings, black matrices, black column spacers and other light shielding coating elements.

An additional feature of the present invention is to provide a method of making the UV-curable coatings, black matrices, black column spacers and other light shielding coating elements, and devices which incorporate them.

An additional feature of the present invention is to provide a dispersion comprising dual phase filler particles, solvent and optional dispersing aid.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to UV-curable coatings, cured coatings, black matrices, black column spacers and other light shielding elements in a LCD comprising a filler-polymer composition. The filler-polymer composition of the UV-curable coating, cured coating, black matrix, black column spacer or other light shielding coating elements in a LCD can include a combination of at least one polymer with at least one filler. The filler comprises one or more of the following:

a) a controlled amount of a dual phase filler having a silica phase and a carbon phase, or b) a dual phase filler having a silica phase and a carbon phase, wherein said silica phase is a controlled surface coverage amount of the silica phase, or c) a dual phase filler having a silica phase and a carbon phase, wherein the dual phase filler has a controlled morphology. The filler can have any particle size. For instance, the dual phase filler can be aggregates with an average aggregate size of less than 250 nm.

The present invention further relates to UV-curable coatings, cured coatings, black matrices, black column spacers and other light shielding elements in a LCD which comprise a polymer composition having at least one polymer and a dual phase filler having a silica phase and a carbon phase, wherein the dual phase filler has an exposed outer surface area and the silica phase comprises from about 50% to about 99% by surface area of the exposed outer surface area. The black matrix further can have a resistivity of $10^{10}$ to $10^{16}$ Ohm/sq, a dielectric constant of less than 20, an optical density of at least 1 or more at a thickness of about 1 micron, or any combinations of these properties.

In addition, the present invention relates to UV-curable coatings, cured coatings, black matrices, black column spacers and other light shielding elements in a LCD which comprise a polymer composition having at least one polymer and at least one dual phase filler having an exposed outer surface area, wherein the dual phase filler has a OAN from about 50 cc/100 g filler to 200 cc/100 g filler, a silica content of about 10 wt % to about 90 wt % based on the weight of the dual phase filler, and the silica phase comprises from about 50% to about 95% by surface area of the exposed outer surface area.

The present invention further relates to UV-curable coatings, cured coatings, black matrices, black column spacers and other light shielding elements in a LCD which comprise a polymer composition comprising at least one polymer and at least one filler, for instance a filler having an OAN number of at least about 65 cc/100 g filler, wherein the electrical resistivity of the filler-polymer composition changes an order of magnitude of 2 or less, at a loading of from 5 to 35 wt %, based on the weight percent of the overall filler-polymer composition. The filler used in the UV-curable coatings, cured coatings, black matrices, black column spacers and other light shielding elements in a LCD can be or include a dual phase filler having a silica phase and a carbon phase.

Also, the present invention relates to products or articles containing one or more of the UV-curable coatings, cured coatings, black matrices, black column spacers and other light shielding elements in a LCD which comprise filler-polymer compositions of the present invention. The product or article can be or include a liquid crystal device, and the like.

The present invention further relates to a method of making a UV-cured coating, black matrix, black column spacer and other light shielding element in a LCD which comprises (i) combining at least one curable polymer with vehicle and the indicated at least one filler to provide a curable filler-polymer composition; (ii) applying the curable filler-polymer composition onto a substrate to form a curable coating; (iii) curing the coating imagewise to form a cured coating; and (iv) developing and drying the cured coating.

The present invention further relates to a liquid dispersion comprising dual phase filler, solvent and optional dispersing aid.

The present invention further relates to a method of making a dispersion comprising dual phase filler, solvent and optional dispersing aid which comprises (i) combining at least one dual phase filler with vehicle (solvent) and optional dispersing aid; (ii) subjecting the mixture to particle size reduction by means such as high shear mixing using the equipment capable of providing a grinding, impact, or similar impingement action, such as horizontal media mills, vertical media mills such as attritors, ball mills, hammer mills, pin disk mills, fluid energy mills, jet mills, fluid jet mills, impingement jet mills, rotor-stators, pelletizers, homogenizers, sonicators, cavitators, and the like.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

Figure 1A:
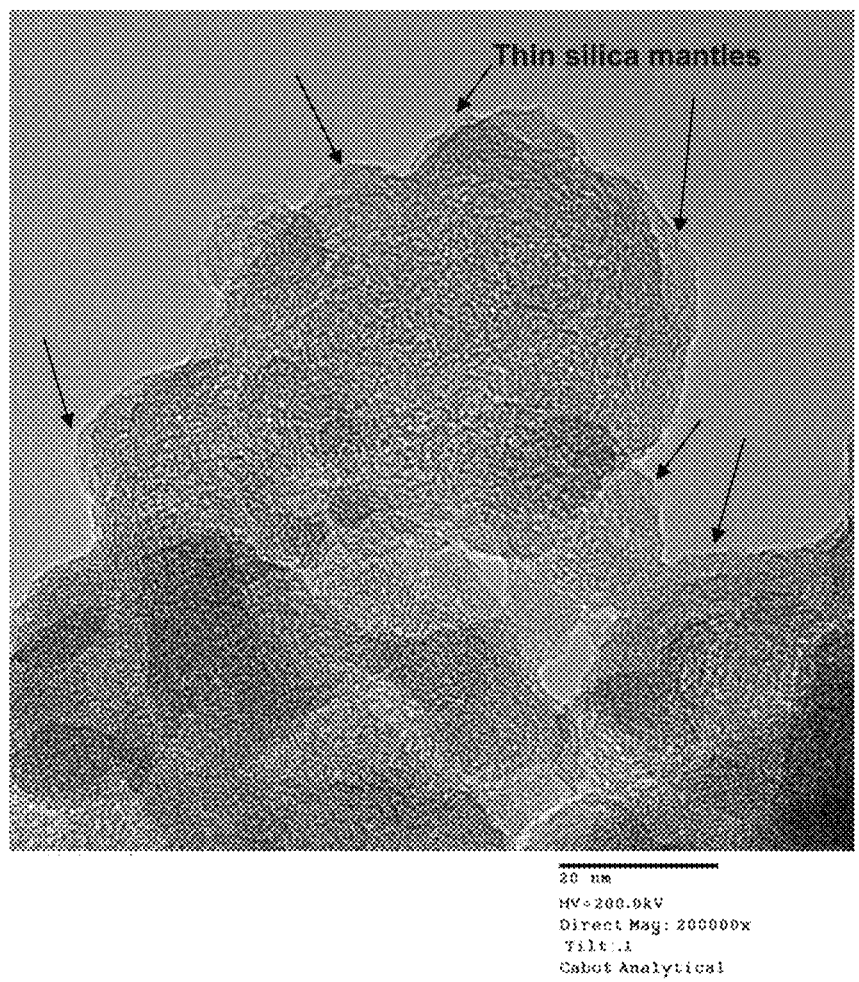
FIG. 1A is a High Resolution TEM image (200,000×) of a dual phase silica carbon black filler particles. Surface silica mantles are shown with arrows.

The present invention relates to UV-curable coatings, cured coatings, black matrices, black column spacers and other light shielding elements in LCD black matrices which contain one or more filler-polymer compositions with combinations of high resistivity, low dielectric constant, and good optical density properties. The present invention further relates to UV-curable coatings, cured coatings, black matrices, black column spacers and other light shielding elements in LCD which contain one or more filler-polymer compositions with controlled electrical properties, such as controlled electrical resistivity, dielectric constant, or both. In the present invention, the electrical resistivity can be controlled such that the surface electrical resistivity of a UV-curable coating, a cured coating or film formed therefrom, a black matrix, a black column spacer and other light shielding element in an LCD formed from the filler-polymer composition can be $10^6$ to $10^{16}$ ohms per square (Ohm/sq or Ω/sq) or more, such as from $10^8$ to $10^{16}$ Ohm/sq, or from $10^{10}$ to $10^{16}$ Ohm/sq, or from $10^{10}$ to $10^{15}$ Ohm/sq, or from $10^{10}$ to $10^{14}$ Ohm/sq, or from $10^{11}$ to $10^{16}$ Ohm/sq, or from $10^{11}$ to $10^{15}$ Ohm/sq, or from $10^{11}$ to $10^{14}$ Ohm/sq, or from $10^{12}$ to $10^{16}$ Ohm/sq, or from $10^{12}$ to $10^{15}$ Ohm/sq, or from $10^{12}$ to $10^{14}$ Ohm/sq, or from $10^{14}$ to $10^{16}$ Ohm/sq, or other controlled amounts. The electrical resistivity can be, for instance, volume resistivity and/or surface resistivity. The electrical resistivity is with respect to the composition that contains the filler and polymer, which can be used in forming a UV-curable coating, cured coatings or films, a black matrix, a black column spacer and other light shielding elements in an LCD of the present application.

A surprising feature of the UV-curable coating, a cured coating or film, a black matrix, a black column spacer and other light shielding elements in an LCD of the present application is that although the presence of silica in dual phase particles used as a component thereof can negatively influence particle light shielding capacity, silica surface domains of the dual phase particles provide a way to control resistivity and dielectric constant with suitable optical density still provided for a UV-curable coating, a cured coating or film, a black matrix, a black column spacer and other light shielding elements in an LCD. As shown by examples provided herein, high resistivity and suitable optical density can be reached with the dual phase particles having silica surface coverage equal to or above 50%. Conventional carbon black with the same morphology is too conductive. UV-curable coatings comprising silica-carbon black dual phase particles can show both high surface electrical resistivity and optical density for black matrix, black column spacer and other light shielding coating elements uses. Further, these UV-curable coatings which contain the dual phase particles and polymer can form low dielectric constant film materials. The dual phase filler particles having a silica surface coverage equal to or above 50%, for example, can be used in filler-polymer compositions to provide low dielectric constant layer, such as films having a dielectric constant of less than 20, or less than 15, or less than 10, or from 1 to less than 20, or from 5 to less than 20, or from 10 to less than 20, or other values. For purposes of the present invention, and unless stated otherwise, all values for dielectric constant are measured at 1 MHz. The UV-curable coatings, cured coatings or films, black matrices, black column spacers and other light shielding elements in LCD containing these dual phase filler products can further provide suitable color properties (such as optical density). The dual phase fillers can be used in filler-polymer compositions to provide coatings which have optical density such as greater than or equal to 1 per one micron (μm) thickness, or greater than or equal to 1.1 per one micron thickness, or greater than or equal to 1.3 per one micron thickness, or greater than or equal to 1.5 per one micron thickness, or greater than or equal to 1.7 per one micron thickness, or greater than or equal to 1.9 per one micron thickness or higher values. In other words, the optical density values provided are based upon a measurement of a coating having a one micron thickness or per one micron increments in the coating. These optical density values can apply to curable, cured, or both of these forms of coatings of the present invention.

The filler in the polymer compositions used in UV-curable coatings, cured coatings or films, black matrices, black column spacers and other light shielding elements in LCD of the present application can be a dual phase filler which includes a silica phase and a carbon phase. The dual phase filler-polymer compositions can be used to make composites, such as in the forms of layers, coatings or films, with high electrical resistivity that are used in making black matrices, black column spacers or other light shielding elements in LCD. A black matrix, black column spacer or other light shielding coating elements can be prepared, for example, with a coating film containing the dual phase filler and polymer, wherein the dual phase filler has good thermal stability when exposed at elevated temperature (e.g., a baking step). The good thermal stability of the dual phase filler (that provide electrical and color functions in black matrix, black column spacer or other light shielding coating elements in LCD) is very useful, particularly where more aggressive baking conditions or several temperature cycles are used. Since the black matrix layer, black column spacer or other light shielding coating element is loaded with particles, even small changes in their surface composition during baking step(s) can lead to the variability in resistivity performance. A robust manufacturing process for preparing UV-curable coatings, cured coatings or films, black matrices, black column spacers or other light shielding elements in LCD can be provided using the filler-polymer compositions containing the dual phase fillers of the present application. The present invention also relates to color filter on arrays having these black matrices, and liquid crystal devices including these color filter on arrays. Processing steps used to provide other components in these devices that may expose the black matrix, black column spacer or other light shielding coating elements in LCD to additional heating can be better tolerated.

In providing a UV-curable coating, cured coating or film, black matrix, black column spacer or light shielding coating elements in LCD that has a filler-polymer composition with the indicated good overall performance and/or controlled electrical resistivity, at least one polymer can be combined with at least one filler to form a filler-polymer mixture. In combining the at least one polymer with at least one filler, the preparation of the composition includes selecting/choosing/using at least one filler based on one or more of the following characteristics/features/parameters of the filler that is used to form the filler-polymer composition:

a) a controlled amount (e.g., loading level) of a dual phase filler having a silica phase and a carbon phase, or b) a dual phase filler having a silica phase and a carbon phase, wherein the silica phase is a controlled surface coverage amount of the silica phase, or c) a dual phase filler having a silica phase and a carbon phase, wherein the dual phase filler has a controlled morphology (e.g., controlled surface area and/or structure, wherein surface area can be expressed, for example, as iodine number ($I_2$ no.), and structure can be expressed, for example, as oil absorption number (OAN)); or d) any combination of a), b), and c). The fillers of a), b), and/or c) may be generally referred to herein as "dual phase filler."

The present invention also relates to a method to control impedance and dielectric constant in a filler-polymer composition used in a black matrix, black column spacer or other light shielding coating elements in an LCD comprising the indicated combination of at least one polymer with the at least one filler a), b), c), or any combination thereof.

A black matrix, black column spacer or light shielding elements in an LCD of the present application can be provided as a patterned thin film of the filler-polymer composition on a substrate of a liquid crystal or other color display device. A patterned, thin film form of the filler-polymer composition as present in a black matrix, black column spacer or other light shielding coating elements in an LCD can be formed, for example, from a filler-polymer composition in a coatable and curable dispersion form. A coatable and curable dispersion form of the composition can further contain a vehicle, such as a volatizable solvent, in addition to the filler and polymer. Optionally, a dispersing aid can be present to facilitate the dispersion of dual phase filler into the formulation. The polymer can be a heat and/or catalytically curable polymer, such as a curable acrylic-based resin or other curable resins.

The present invention further relates to a Color Filter on Array (COA) which includes the black matrix. COA can be used to make an LCD with better aperture ratio and more energy efficiency. The COA design includes the black matrix, which can be directly coated on a thin film transistor (TFT). The COA-TFT configuration necessitates materials for the black matrix that show low dielectric constant and high electrical resistivity to prevent capacitive interference and signal delays in LCD. In view of these considerations, low dielectric constant and highly resistive particles that provide good optical density for use in black matrices, which can be provided by the dual phase fillers used in filler-polymer compositions of the present application.

The present invention further relates to a method of forming UV-cured coating, black matrix, black column spacer or other light shielding coating elements in LCD by applying a curable coating composition containing the dual phase filler, a curable polymer and a vehicle onto a substrate to form a curable coating, curing the curable coating imagewise to form a cured coating, and developing and drying the cured coating.

Curable coating forms of the indicated filler-polymer composition used for forming a black matrix can comprise, for example, a volatizable vehicle, a curable polymer, and at least one of the indicated dual phase fillers a), b), c), or any combination thereof. The vehicle may be either an aqueous vehicle or a non-aqueous vehicle. While both aqueous and non-aqueous liquid vehicles can be used, the liquid vehicle can preferably be a non-aqueous vehicle for some uses. Examples include non-aqueous vehicles comprising butyl acetate, ethylcellosolve, ethylcellosolve acetate, butylcellosolve, butylcellosolve acetate, ethylcarbitol, ethylcarbitol acetate, diethyleneglycol, cyclohexanone, propyleneglycol monomethylether, propyleneglycol monomethylether acetate, lactate esters, dimethyl formamide, methyl ethyl ketone, dimethylacetamide, and mixtures thereof. Aqueous solvents may also be added, including, for example, water and water soluble alcohols. The vehicle can be a fluid at room temperature that can be selectively volatized for removal from the filler-polymer compositions after coating, such as by baking the coated composition at elevated temperature(s).

The curable polymer may be any resin known in the art. For example, the resin may be an acrylic resin, or a methacrylic resin. The resin, for example, may be an epoxy bisphenol-A resin, or an epoxy novolac resin. The resin may be a polyimide resin, a urethane resin, a polyester resin, or a gelatin. Combinations of these resins may be used. Additional examples of resins are indicated hereinbelow. The resin is one that may be cured by a variety of known methods, including, for example, by any source of radiation such as, for example, infrared or ultraviolet radiation or in combination with thermal curing. The curable coating composition may be photosensitive (i.e. may be cured by irradiation, such as by exposure to and absorbing actinic radiation). When the resin is curable by irradiation, the curable coating composition may further comprise a photoinitiator, which generates a radical on absorbing light with the respective pigment. Conventional photoinitiators for photosensitive resins can be used, for example, in this respect in any effective amount. Also, monomers, such as acrylates, methacrylates, epoxides, or styrenics, may be included. The curable coating composition can be formed with a minimum of additional components (additives and/or cosolvents) and processing steps. However, additives such as dispersing aids, surfactants and cosolvents may be included. For example, when a photosensitive resin is used, such as epoxy bisphenol-A or epoxy novolac, a photoinitiator can also be added. Monomers and/or oligomers may be added.

The curable coating composition may be formed using any method known to those skilled in the art, including, for example, using high shear mixing. Furthermore, the compositions may be prepared using a dispersion of the dual phase filler, such as a millbase. In formulating curable coating compositions, for example, the total amount of dual phase filler can be from about 1 wt % to about 60 wt %, or from about 3 wt % to about 50 wt %, or from about 4 wt % to about 35 wt %, or from about 5 wt % to about 25 wt %, of the total weight of the curable coating composition, or other amounts. The total amount of dual phase filler can be such that, when the coating composition is used to form a curable coating and subsequently cured, the resulting cured coating comprises greater than or equal to about 1 wt %, or greater than or equal to 5 wt %, or greater than or equal to about 10 wt %, or greater than or equal to about 15 wt %, or greater than or equal to about 20 wt %, or greater than or equal to about 30 wt %, or greater than or equal to about 40 wt %, or greater than or equal to about 50 wt % total dual phase filler based on the total weight of the cured coating, or can comprise from about 1 wt % to about 80 wt %, or from about 50 wt % to about 80 wt %, or from about 1 wt % to about 50 wt %, or from about 1 wt % to about 40 wt %, or from about 1 wt % to about 30 wt %, or from about 5 wt % to about 50 wt %, or from about 5 wt % to about 40 wt %, or from about 5 wt % to about 35 wt %, or from about 10 wt % to about 50 wt %, or from about 10 wt % to about 40 wt %, or from about 10 wt % to about 30 wt %, or from about 15 wt % to about 35 wt %, or from about 20 wt % to about 40 wt % total dual phase filler based on the total weight of the cured coating, or other amounts. The polymer content in the blend with the filler and vehicle used to formulate the curable coating composition may vary, such as depending on the type of polymer, and can vary, for example, from about 5 to about 95 wt %, or from 10 wt % to about 90 wt %, or from 15 wt % to about 80 wt %, or from about 20 wt % to 70 wt %, or from about 25 wt % to about 60 wt %, or other values. The vehicle (e.g., solvent) content in the blend with the filler and polymer may vary from about 0 to about 90 wt %, or from 1 wt % to about 95 wt %, or from 5 wt % to about 75 wt %, or from about 10 wt % to 50 wt %, or other values. The polymer content in the cured coating or film containing the filler and polymer can comprise, for example, from about 99 wt % to about 20 wt %, or from about 50 wt % to about 20 wt %, or from about 95 wt % to about 50 wt %, or from about 95 wt % to about 60 wt %, or from about 95 wt % to about 65 wt %, or from about 90 wt % to about 70 wt %, or from about 85 wt % to about 65 wt %, or from about 80 wt % to 60 wt % polymer based on the total weight of the cured coating, or other amounts.

Additional ingredients for the filler-polymer compositions may include those such as described in U.S. Patent Application Publication Nos. 2011/0009551 and 2012/0092598, which are incorporated herein by reference in their entireties. Carbon blacks and/or other types of black pigments or even pigments colored different from black pigments, for example, may be used in combination with the dual phase filler in the polymer compositions, provided they are used in amounts that do not undermine a required performance property of the overall colorant pigment for its intended use. Representative examples of black pigments and colored pigments are provided, for example, in the above-indicated patent application publications, and reference can be made thereto. Such carbon blacks and pigments are commercially available in either powder or press cake form from a number of sources including, for example, Cabot Corporation, BASF Corporation, Engelhard Corporation and Sun Chemical Corporation, and others. In filler-polymer compositions that further combine the dual phase filler with at least one carbon black and/or colorant or pigment mixture, the dual phase filler mentioned herein can comprise about 1 wt % or more, about 5 wt % or more, about 10 wt % or more, about 20 wt % or more, about 30 wt % or more, about 40 wt % or more, about 50 wt % or more, about 60 wt % or more, about 70 wt % or more, about 80 wt % or more, about 90 wt % or more, about 95 wt % or more, or 100%, or from about 1 wt % to about 100%, or from about 5 wt % to about 95 wt %, or from about 10 wt % to about 90 wt %, or from about 20 wt % to about 80 wt %, or from about 30 wt % to about 70 wt %, or from about 50 wt % to about 100 wt % of all filler (by weight percent of filler present) in the filler-polymer composition. As indicated, the dual phase filler can be the predominant (≥50%) type or only type of all filler used in the filler-polymer composition.

High shear mixing equipment which can be used to form a blend of the filler, polymer, vehicle, and any other additives, is known in the art and includes, for example, equipment capable of providing a grinding, impact, or similar impingement action, such as horizontal media mills, vertical media mills such as attritors, ball mills, hammer mills, pin disk mills, fluid energy mills, jet mills, fluid jet mills, impingement jet mills, rotor-stators, pelletizers, homogenizers, sonicators, cavitators, and the like.

With further regard to the polymer that can be used in forming the filler-polymer composition, the polymer can be any one or more other polymers than those above-described. For instance, further to the polymers indicated above, the polymer alternatively or additionally can be any other thermoplastic or thermoset polymer which can be used in combination with the filler to form a UV-curable coating, cured coating, black matrix, black column spacer coating or other light shielding coating elements in an LCD. Preferably, the polymer is an acrylic polymer, or a methacrylic polymer, but would largely depend upon the intended application in a black matrix.

The polymers that form the filler-polymer composition can be pre-formed prior to combining with the one or more fillers, or one or more polymers can be formed in situ in the presence of one or more fillers. Any polymerization technique can be used to form the one or more polymers, such as emulsion polymerization, suspension polymerization, free radical polymerization, and the like.

Generally, any known polymer or combination of polymers especially used to form articles can benefit from the present invention with respect to controlling electrical resistivity, dielectric constant and forming products with controlled resistivity and dielectric constant.

The filler and polymer(s) can be combined using conventional techniques, such as blending, mixing, extruding, and the like.

Figure 1B:
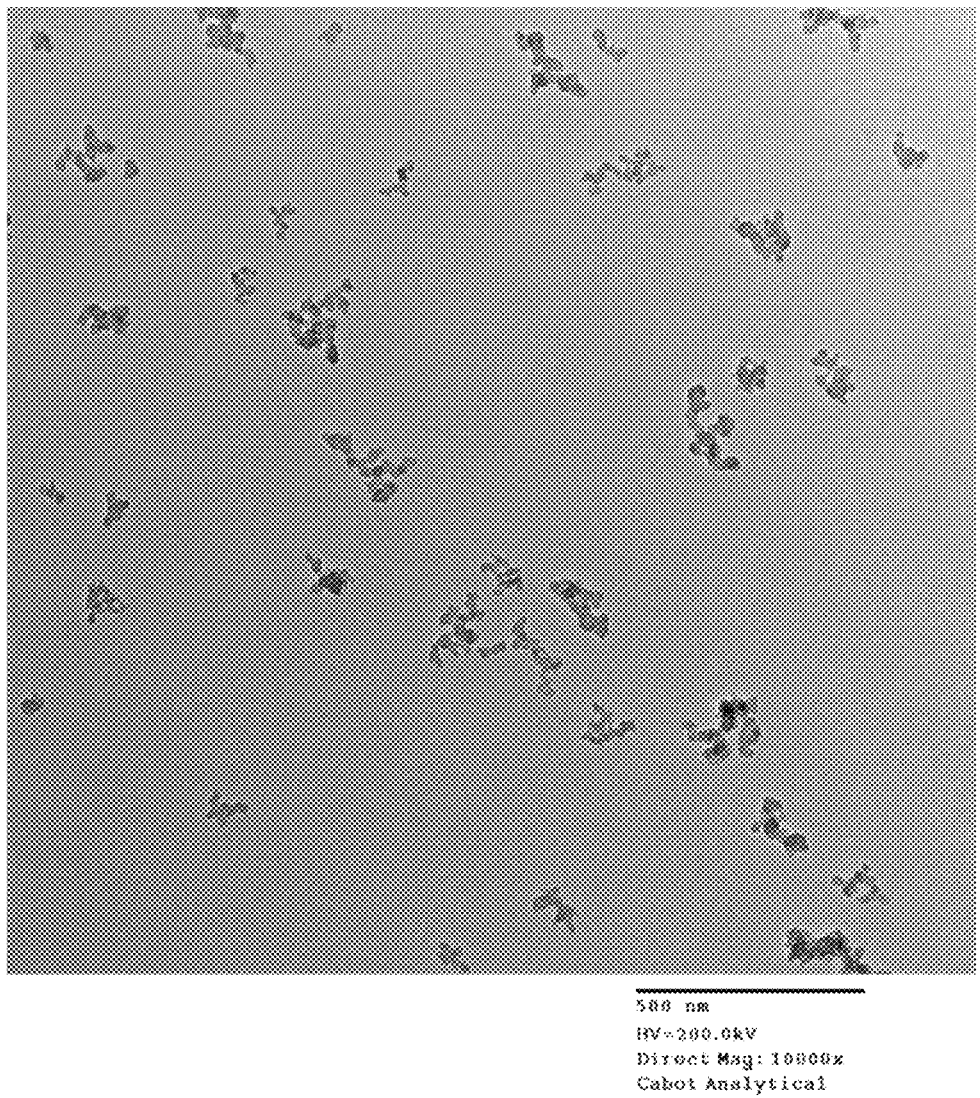
FIG. 1B is a Low Resolution TEM image (10,000×) of a dual phase silica carbon black filler particles.

With regard to the filler, at least one of the fillers used is a dual phase filler. The dual phase filler has a silica phase and a carbon phase. It is to be understood that the silica phase can be continuous or non-continuous, and the carbon phase can be continuous or non-continuous. Further, the term "dual phase filler" refers to the existence of a silica phase and a carbon phase, but it is to be understood that the silica phase can be multiple silica phases and/or the carbon phase can be multiple carbon phases. FIG. 1A is a high resolution TEM picture showing one example of a dual phase filler. The arrows in FIG. 1A point to examples of silica phase mantles or silica phase surface coverage of the filler. FIG. 1B is the low magnification TEM image of the dual phase particle with 90% silica surface coverage. As evident from the image, the aggregate structure of dual phase filler resembles that of a carbon black.

In the dual phase filler, a silicon containing species, such as an oxide or carbide of silicon, for instance, a silica phase(s), is distributed through at least a portion of the filler as an intrinsic part of the filler. Similarly, the carbon phase(s) is distributed through at least a portion of the filler as an intrinsic part of the filler. The carbon phase is essentially a carbon black region(s) which exists as a carbon phase in the filler. Conventional carbon blacks exist in the form of aggregates, with each aggregate consisting of a single phase, which is carbon. This phase may exist in the form of a graphitic crystallite and/or amorphous carbon, and is usually a mixture of the two forms. Carbon black aggregates may be modified by depositing silicon-containing species, such as silica, on at least a portion of the surface of the carbon black aggregates. The result may be described as silica-coated carbon blacks. This is different from a dual phase filler.

The materials described herein as dual phase fillers are not carbon black aggregates which have been coated or otherwise modified, but actually represent a different kind of aggregate having two phases. One phase is carbon, which will still be present as graphitic crystallite and/or amorphous carbon, while the second phase is silica (and possibly other silicon-containing species). Thus, the silicon-containing species phase of the dual phase filler is an intrinsic part of the aggregate; it is distributed throughout at least a portion of the aggregate. It will be appreciated that the dual phase fillers are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in. e.g., U.S. Pat. No. 6,929,783. Methods of making various types of dual phase fillers or silicon-treated carbon blacks and various compositions containing the same that can be used in the present application are described in U.S. Pat. Nos. 7,199,176; 6,709,506; 6,686,409; 6,534,569; 6,469,089; 6,448,309; 6,364,944; 6,323,273; 6,211,279; 6,169,129; 6,057,387; 6,028,137; 6,008,272; 5,977,213; 5,948,835; 5,919,841; 5,904,762; 5,877,238; 5,869,550; 5,863,323; 5,830.930; 5,749,950; 5,747,562; and 5,622,557, and U.S. Published Patent Application No. 2002/0027110, all incorporated in this application, in their entirety by reference herein.

The carbon-silica dual phase particles may be produced by manufacturing the carbon black in the presence of silicon-containing compounds. Typically, carbon blacks are produced in a staged furnace reactor, including a combustion zone, a converging diameter zone, a restricted diameter feedstock injection zone, and a reaction zone. Hot combustion gases are generated in the combustion zone by contacting a liquid or gaseous fuel with a suitable oxidant stream, such as air, oxygen, or mixtures thereof. The oxidant stream may be preheated to facilitate the generation of hot combustion gases. Any readily combustible gas, vapor, or liquid stream, including natural gas, hydrogen, methane, acetylene, alcohols, or kerosene, may be used to contact the oxidant in the combustion zone to generate hot combustion gases. Preferably, fuels having high carbon content, such as hydrocarbons, petroleum refinery oils from catalytic cracking operations, as well as coking and olefin manufacturing operation by-products, are burned in the combustion zone. The ratio of oxidant to fuel varies with the type of fuel utilized. For example, when natural gas is used, the ratio of oxidant to fuel can be from about 10:1 to about 1000:1. Once generated, the hot combustion gas stream is directed into the reactor in the reaction zone. The carbon black feedstock stream is introduced into the reactor in the injection zone. Typically, the feedstock is injected into the hot combustion gas stream through nozzles designed for optimum distribution of the feedstock. A single- or bi-fluid nozzle may be used to atomize the feedstock. The carbon black is then produced by pyrolysis, or partial combustion, in the reaction zone as the feedstock and the hot combustion gases are mixed. A cooling fluid, such as water, is then sprayed into the gas stream containing the formed carbon black particles, in a quench zone that is positioned downstream of the reaction zone. The quench is used to decrease the reaction rate and cool the carbon black particles. The quench stream is positioned at a predetermined distance from the reaction zone; alternatively, a plurality of quench streams may be positioned throughout the reactor. After the carbon black is sufficiently cooled, the product is separated and recovered by conventional methods. The separation of the carbon black from the gas stream is readily accomplished by conventional means such as a precipitator, cyclone separator, bag filter, or other means known to those skilled in the art.

The carbon-silica dual phase particles can be produced by introducing a volatilizable silicon-containing compound into the carbon black reactor at a point upstream of the quench zone. Preferably, the silicon-containing compound is volatilizable at carbon black reactor temperatures. Non-limiting examples of suitable silicon-containing compounds include tetraethoxyorthosilicate (TEOS), silanes (such as alkoxysilanes, alkylalkoxysilanes, and aryl-alkylalkoxysilanes), silicone oil, polysiloxanes and cyclic polysiloxanes (such as octamethylcyclotetrasiloxane (OMTS), decamethylcyclopentasiloxane, dodecamethylcyclohexasiloxane, and hexamethylcyclotrisiloxane), and silazanes (such as hexamethyldisilazane). Examples of suitable silanes include tetramethoxysilane, tetraethoxysilane, methyltrimethoxysilane, methyltriethoxysilane, dimethyldimethoxysilane, dimethyldiethoxysilane, trimethylmethoxysilane, trimethylmethoxysilane, diethylpropylethoxysilane, and halogenorganosilanes such as, for example, tetrachlorosilane, trichloromethylsilane, dimethyldichlorosilane, trimethylchlorosilane, methylethyldichlorosilane, dimethylethylchlorosilane, and dimethylethylbromosilane. Besides volatilizable compounds, decomposable silicon-containing compounds which are not necessarily volatilizable can also be used to yield the silicon-treated carbon black. Other suitable silicon-containing compounds that can be used to yield the silica-treated carbon black include cyclic polysiloxanes of the types D3, D4, and D5, and polysiloxanes or silicone oils, many of which are well known in the art. The usefulness of these compounds can be readily determined by their volatilizability and/or decomposability. Low molecular weight silicon-containing compounds are preferred.

The silicon-containing compound may be premixed with the carbon black feedstock and introduced into the reactor through the feedstock injection zone. Alternatively, the silicon-containing compound may be introduced into the reactor separately, either upstream or downstream from the feedstock injection zone. The silicon-containing compound, however, is introduced upstream from the quench zone. Upon volatilization, and exposure to the high reactor temperatures, the silicon-containing compound decomposes within the reaction zone and forms the carbon-silica dual phase particles, such that silica becomes an intrinsic part of the carbon black. If the silicon-containing compound is introduced substantially simultaneously with the feedstock, the silica-containing regions can be distributed throughout at least a portion of the carbon black aggregate. The silicon-containing compound may alternatively be introduced to the reaction zone at a point after carbon black formation has commenced but before it has been subjected to the quench. In such an event, carbon-silica dual phase particles can be obtained in which silica or a silicon-containing species is present primarily at or near the surface of the carbon black aggregate.

In the carbon-silica dual phase particles useful in the invention, silicon or a silicon-containing species, including but not limited to, silicon oxides. e.g., $SiO_2$ may be distributed through at least a portion of the carbon black aggregate as an intrinsic part of the carbon black. The silicon concentration in the carbon-silica dual phase particles can be determined, for example, by the flow rate of the silicon-containing compound into the reactor. The carbon black aggregates may be formed into pellets, wherein the pellets can be used in coatings and devices such as described herein. Generally known techniques or others for pelletizing carbon black can be applied to make the pellets.

The dual phase filler can include silicon-containing regions (e.g., silica regions) primarily at the aggregate surface of the filler, but still be part of the filler and/or the dual phase filler can include silicon-containing regions (e.g., silica regions) distributed throughout the filler. The dual phase filler can be oxidized. The dual phase filler can contain from about 0.1% to about 90% silica by weight or more, based on the weight of the dual phase filler. These amounts can be from about 0.5 wt % to about 50 wt %, from about 2 wt % to about 45 wt %, from about 5 wt % to about 40 wt %, from about 10 wt % to about 45 wt %, from about 15 wt % to about 45 wt %, from about 20 wt % to about 50 wt %, from about 0.5 wt % to about 25 wt % or from about 2 wt % to about 15 wt % silicon, all based on the weight of the dual phase filler. Further exemplary amounts are provided below.

The dual phase filler, as an option, has at least part of the silica phase on the surface of the dual phase filler. In other words, the dual phase filler has an exposed outer surface and at least part of the silica phase, as an option, is present on the exposed surface of the dual phase filler. The amount of exposed surface coverage that is the silica phase can be varied. The amount of the silica phase present on the exposed surface area of the dual phase filler can be less than 100% by surface area. In other words, at least 0.1% by surface area of the exposed surface area of the dual phase filler can be a carbon phase. The amount of surface coverage of the silica phase on the exposed surface area of the dual phase filler can range, for instance, from 0.1% to 99.9%, 1% to 99%, 5% to 95%, 5% to 90%, 5% to 85%, 5% to 80%, 5% to 75%, 5% to 70%, 5% to 65%, 5% to 60%, 5% to 55%, 5% to 50%, 50% to 99.9%, 50% to 95%, 50% to 90%, 50% to 85%, 50% to 80%, 50% to 75%, 50% to 70%, 50% to 65% by surface area. The surface coverage amount of the silica phase that is part of the exposed surface area of the dual phase filler can be the following: 1%-5%; 5%-10%; 10%-15%; 15%-20%; 20%-25%; 25%-30%; 30%-35%; 35%-40%; 40%-45%; 45%-50%; 50%-55%; 55%-60%; 60%-65%; 65%-70%; 70%-75%; 75%-80%; 80%-85%; 85%-90%, wherein the percent is a reference to the percent surface area based on the total exposed surface area of the dual phase filler. As indicated, high resistivity and optical density suitable for black matrices can be reached, for example, with dual phase particles having a silica coverage equal to or above 50%, or equal to or above 55%, or equal to or above 60%, or equal to or above 65%, or equal to or above 70%, or equal to or above 75%, or equal to or above 80%, or equal to or above 85%, or equal to or above 90%, or from 50% to 95% or higher, or from 50% to 90%, or from 50% to 85%, or from 50% to 80%, or from 50% to 75%, or from 50% to 70%, or from 55% to 90%, or from 60% to 90%, or from 65% to 90%, or from 70% to 90%, or other values. A test that can be used to determine the amount of silica surface coverage is provided in the paper entitled "New Generation Carbon-Silica Dual Phase Filler Part I. Characterization And Application To Passenger Tire" Rubber Chemistry And Technology, Vol 75(2), pp. 247-263 (2002), incorporated in its entirety by reference herein.

The dual phase filler can have a variety of morphology with respect to, for instance, iodine number and/or OAN number. The OAN number can be at least 50 cc/100 g filler, such as from 50 to about 200 cc/100 g filler. The iodine number can be 200 mg/g or lower, such as from 5 to 200 mg/g. The dual phase filler can have an OAN between 50 cc/100 g filler and 200 cc/100 g filler. The dual phase filler can have an OAN of 60 to 140 cc/100 g filler. The dual phase filler can have an OAN of 141 to 200 cc/100 g filler. The OAN is measured based on ASTM D2414, which is incorporated in its entirety herein by reference. Iodine number can be measured, for example, based on ASTM standard D1510.

As an option, the dual phase filler can have a primary particle size of 50 nm or less, such as from 5 nm to 50 nm, 6 nm to 45 nm, 7 nm to 40 nm, 8 nm to 40 nm, 10 nm to 35 nm, 5 nm to 30 nm, 5 nm to 25 nm, 5 nm to 20 nm, 5 nm to 15 nm, or 5 nm to 10 nm. This primary particle size can be the average primary particle size.

In the present invention, the dual phase filler comprises, consists essentially of, or consists of particles with an average aggregate size of less than 250 nm, such as 249 nm to 30 nm, 200 nm to 30 nm, 150 nm to 30 nm, 100 nm to 30 nm, and the like. The particles can be an aggregate(s) of fused primary particles or a complex cluster(s) of fused primary particles. The particles can be this aggregate or complex cluster and have one of these size range(s). As an option, the dual phase filler can comprise fused primary particles with an average aggregate size of less than 250 nm and a primary particle size of 50 nm or less. The primary particle size can be 50 nm or less, 45 nm or less, such as from 5 nm to 50 nm, 6 nm to 45 nm, 7 nm to 40 nm, 8 nm to 40 nm, 10 nm to 35 nm, 5 nm to 30 nm, 5 nm to 25 nm, 5 nm to 20 nm, 5 nm to 15 nm, or 5 nm to 10 nm. The primary particle size can be the average primary particle size. The average aggregate size and average primary particle size can be determined, for example, by ASTM Test "Standard Test Method for Carbon Black—Morphological Characterization of Carbon Black Using Electron Microscopy".

As an option, the dual phase filler can have less than 1 wt % weight loss when subjected to a temperature of from 120° C. to 450° C. in air with a temperature ramp of 5 deg C. per minute The wt % loss can be from 0.1 wt % to 0.99 wt %, such as from 0.1 wt % to 0.95 wt % or from 0.5 to 0.9 wt %, based on the weight of the dual phase filler.

The dual phase filler can have a total silica phase amount in the dual phase filler that ranges from 1 wt % to 90 wt % or more, based on the weight of the dual phase filler. The silica phase can be present in an amount of from 5 wt % to 90 wt %, or from 10 wt % to 90 wt %, or from 10 wt % to 85 wt %, or from 10 wt % to 80 wt %, or from 10 wt % to 75 wt %, or from 10 wt % to 70 wt %, or from 15% to 90 wt %, or from 15 wt % to 80 wt %, or from 20 wt % to 90 wt %, or from 20 wt % to 75 wt %, or from 25 wt % to 90 wt %, or from 25 wt % to 70 wt %, or from 30 wt % to 90 wt %, or from 30 wt % to 65 wt %, or from 35 wt % to 65 wt %, or from 40 wt % to 85 wt %, or from 50 wt % to 80 wt %, and the like. The weight percent of silica in dual phase filler can be found by thermogravimetric analysis at 600° C. conducted in the presence of air.

Any combination of the various amounts of exposed surface area of silica phase with the various amounts of weight percent of silica phase in the overall dual phase filler is possible, as long as there is sufficient silica phase to achieve the desired surface area.

The remaining amount of the dual phase filler, if not silica phase, is generally the carbon phase. Trace amounts of other components and/or impurities typically found in carbon black feedstocks and/or silica feedstocks can be present in the dual phase filler.

As stated above, the dual phase filler used in the present invention can have a predetermined amount of silica phase on the exposed surface of the dual phase filler. As stated above, the dual phase filler can have a morphology, especially with respect to structure, as shown by OAN number, as for instance provided herein.

Further, the amount of the dual phase filler in a filler-polymer composition can be any amount, such as 1 wt % to 50 wt % or more, based on the total weight of the filler-polymer composition. As indicated, the loading levels of the dual phase filler can range from 5 wt % to 40 wt %, 5 wt % to 35 wt %, 10 wt % to 30 wt %, 15 wt % to 35 wt %, 20 wt % to 40 wt %, or other amounts, all based on the total weight of the filler-polymer composition.

Any combination of these variables, loading levels, exposed surface area of silica phase, and morphology of dual phase filler can be used in the present invention.

The dual phase fillers can have high surface electrical resistivity, low dielectric constant, and high or at least adequate optical density properties for uses in black matrix, black column spaces or in other light shielding coatings which properties can translate well into polymer materials loaded with particles of these fillers and coatings made therefrom. The following correlations were developed/realized in the present invention, which have significance in providing the ability to control the electrical resistivity in a filler-polymer composition to obtain/provide the desired resistivity.

In the present invention, as one aspect, a coating or a device containing the coating (e.g. cured coating) includes a) a 'controlled' amount of a dual phase filler, b) a 'controlled' surface coverage amount of the silica phase, and/or c) a dual phase filler having a 'controlled' morphology. The term 'controlled' refers to selecting or utilizing an amount and/or morphology (as described herein) so that a desired surface and/or volume resistivity in the coating(s) of the present invention can be obtained or dialed in. For instance, by controlling or utilizing one or more of a) through c), the coating(s) of the present invention can obtained a desired surface resistivity, for instance anywhere from $10^6$ to $10^{16}$ Ohm/sq. The present invention herein provides various ranges for amounts of a) and b) and provides various ranges for morphology of the dual phase filler that can be chosen, selected, or used in the coating to achieve the desired resistivity.

Figure 2:
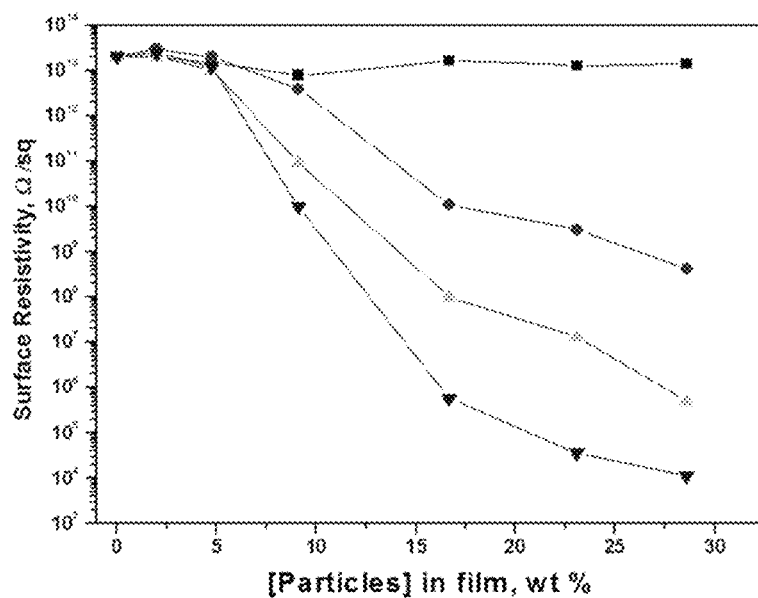
FIG. 2 is a graph showing surface resistivity (ohm/sq.) of acrylic polymer films as a function of dual filler concentration (wt %) and silica surface coverage: ■—85%, •—50%, ▲—30%, ▼—0%. The sample 0% refers to a carbon black (Vulcan 7H, manufactured by Cabot Corporation), which had similar OAN as dual phase fillers used in this study.
Figure 4:
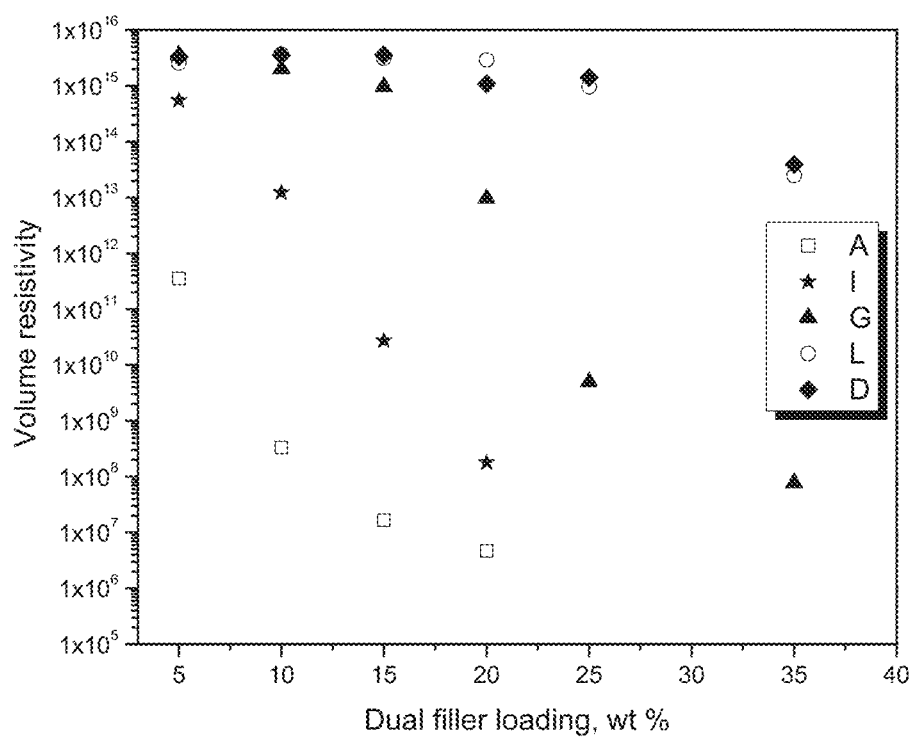
FIG. 4 is a graph showing the volume electrical resistivity (ohm-cm) of the acrylic polymer films compared to dual phase filler loading of some of the dual phase fillers that are set forth in FIG. 3 and Table 1 (dual phase fillers A, I, G, L, D). Total sulfur content for these dual phase particles is less than 300 ppm.

In particular, by controlling the amount of dual-phase filler (e.g., loading level) present in the filler-polymer composition, the electrical resistivity can be controlled. This, in an exemplary way, is shown in FIG. 2 and FIG. 4, wherein it can be seen that as the dual phase filler loading is increased from 0% to 30 wt % in the polymer-filler composition/composite, the surface resistivity and volume resistivity of the composition/composite shown on Log scale decreased. It is noted that the various dual phase fillers, except for the filler identified as "0%," which was conventional pure carbon black with similar particle structure and surface area and used as a comparative, were various dual phase fillers with various amounts of silica phase on the surface (based on percent surface area). Thus, taking into account this relationship, this permits one to control the surface and volume resistivity in a filler-polymer composition.

As an option, more than one filler can be used to achieve a particular electrical resistivity for a black matrix application, which can be based on the amount of each filler and the resistivity that is contributed by that dual phase filler. Further, as an option, in any aspect of the present invention, additional filler that is not a dual phase filler, such as conventional carbon black, can be used. For instance, referring to FIG. 2, a combination of conventional carbon black with one or more of the dual phase fillers would achieve a desired electrical resistivity in the filler-polymer composition. As indicated, the dual phase filler(s) mentioned herein can comprise 1 wt % or more, 5 wt % or more, 10 wt % or more, 20 wt % or more, 30 wt % or more, 40 wt % or more, 50 wt % or more, 60 wt % or more, 70 wt % or more, 80 wt % or more, 90 wt % or more, 95 wt % or more, or 100% of all filler (by weight percent of filler present) in the filler-polymer composition.

Further, the amount of surface coverage of the silica phase on the dual phase filler has the ability to change percolation behavior and therefore control electrical resistivity in the filler-polymer composition precisely to the desired resistivity range. More specifically, a higher controlled surface area amount (with respect to the silica phase) provides a higher electrical resistivity in the filler-polymer composition as evident from FIG. 2 (surface resistivity) and FIG. 4 (volume resistivity). For instance, referring to FIG. 2, a higher silica phase amount at the exposed surface, namely a higher percent of surface area that is silica phase on the surface of the dual phase filler, provides higher electrical resistivity at about constant particle morphology. As can be seen in FIG. 2, conventional carbon black, having a similar particle morphology and no silica phase, provided a sharper drop of resistivity of the composite and the lowest surface resistivity over a variety of loading levels. Realizing that the amount of exposed surface area of the dual phase filler that is a silica phase has the ability to control surface resistivity, this is also one way to control overall electrical resistivity in a filler-polymer composition.

Figure 3:
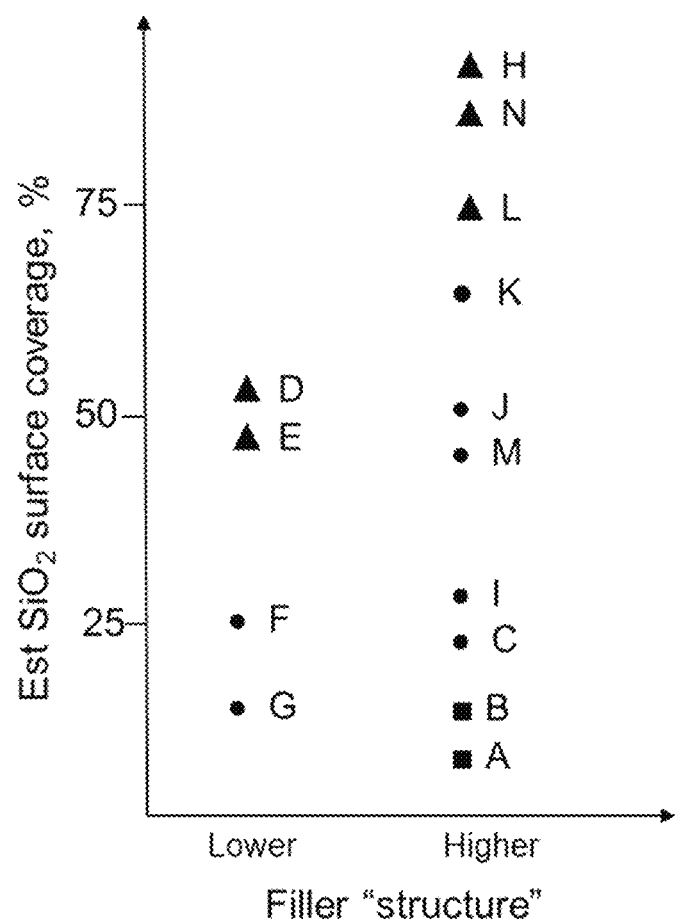
FIG. 3 is a graph showing silica surface coverage, corresponding dual phase particle structure and relationship with the preferred use of the dual phase fillers to control electrical resistivity of coatings and composites: ▲—High resistivity range (>$10^{12}$ Ohm/sq); •—Intermediate resistivity range ($10^8$-$10^{12}$ Ohm/sq); ■—Low end of resistivity range (<$10^8$ Ohm/sq). The dual phase fillers A-N in FIG. 3 are set forth in Table 1.

A third way to control electrical resistivity in a filler-polymer composition is by selecting/controlling the morphology of the dual phase filler. As shown in FIG. 3 and Table 1 (below), typically, a higher iodine number or higher OAN for the filler can contribute to a lower volume resistivity. Further, the results presented in FIG. 4 demonstrate a practical way to extend the onset of percolation of composites comprising dual phase fillers by selection of a dual filler with lower OAN (sample "G" versus sample "1"). FIG. 4 shows percolation curves for filler-polymer composites as a function of filler loading. Full morphology of dual phase particles is given in Table 1. As indicated, total sulfur content for these dual phase filler particles is less than 300 ppm. Another practical implication of the disclosed method to extend the onset of percolation is to compensate the particle structure effect with silica coverage. For example, although dual phase filler "L" had higher particle structure than filler "D" (FIG. 4, Table 1), it showed similar volume resistivity profile with particle concentration as sample "D" due to higher silica coverage (75% versus 54% surface coverage with silica). In Table 1, the total (BET) and external (STSA) area of particles can be determined by ASTM Test D6556-10 "Standard Test Method for Carbon Black—Total and External Surface Area by Nitrogen Adsorption". The column "Target resistivity range" in Table 1 provides an example of selecting silica carbon black dual phase filler particles to reach certain resistivity range in the polymer composites or coatings at the typical filler loadings (20-30 wt %). Herein the term "High resistivity" refers to electrical surface or volume resistivity above $10^{12}$ Ohm/sq or $10^{12}$ Ohm·cm respectively; the term "Intermediate resistivity" refers to the electrical surface or volume resistivity in the range of $10^8$-$10^{12}$ Ohm/sq or $10^8$-$10^{12}$ Ohm·cm; and finally, the term "conductive" or "low resistivity" refers to electrical surface or volume resistivity below $10^8$ Ohm/sq or $10^8$ Ohm·cm respectively.

To obtain the resistivity data that are shown in FIGS. 2 and 4, and those reflected by the high, intermediate or low resistivity classifications of the dual phase fillers shown in FIG. 3, acrylic polymer films containing the fillers were prepared in a similar manner for all the respective film samples using the same method and equipment that are described as used to prepare the acrylic polymer films in Example 1 hereinafter. The volume or surface resistivity that is shown in FIGS. 1-3 or otherwise applicable, was measured in the same manner as indicated in Example 1. The resistivity classifications assigned to the different dual phase fillers in FIG. 3 were based on resistivity measurements performed on acrylic films at the particle loadings typically used in practice (20-30 wt %).

This additional relationship can assist in controlling the desired electrical resistivity in a filler-polymer composition for use in UV curable coatings, cured coatings, black matrices, black column spacers or other light shielding coating elements such as to a desired target range value thereof, while this type of control, if used, preferably is used in a manner that does not undermine the high resistivity property of the compositions for applications in black matrix, black column spacers or other light shielding coating elements in LCD.

TABLE 1

Analytical characteristics of dual phase particles and recommended resistivity ranges

| Sample ID | SiO$_2$, wt % | I$_2$ # | BET m$^2$/g | STSA, m$^2$/g | OAN, ml/ 100 g | SiO$_2$ Surface Coverage, % | Target resistivity range |
|---|---|---|---|---|---|---|---|
| A | 14.45 | 171.4 | 212.4 | 171 | 172.4 | 10 | Conductive |
| B | 8.0 | 120.9 | 156.8 | 135.0 | 176.8 | 17 | Conductive |
| C | 11.4 | 111.4 | 160.0 | 133.6 | 182.4 | 24 | Intermediate |
| D | 45.1 | 61.5 | 148.8 | 116.6 | 123.6 | 54 | high resistivity |
| E | 29.5 | 52.6 | 122.2 | 102.7 | 126.4 | 53 | high resistivity |
| F | 18.0 | 64.6 | 93.1 | 83.2 | 101.6 | 27 | Intermediate |
| G | 12.9 | 87.9 | 111.4 | 99.3 | 87.7 | 17 | Intermediate |
| H | 47.9 | 14.0 | 145.7 | 113.0 | 149.8 | 90 | high resistivity |
| I | 23.5 | 132.9 | 209.3 | 154.3 | 184.5 | 27 | Intermediate |
| J | 37.0 | 65.1 | 164.2 | 119.4 | 206.7 | 54 | Intermediate |
| K | 43.8 | 56.8 | 178.7 | 143.8 | 173.0 | 65 | Intermediate |
| L | 47.4 | 34.9 | 144.9 | 110.6 | 187.5 | 73 | high resistivity |
| M | 31.3 | 77.4 | 169.5 | 126.7 | 207.3 | 50 | Intermediate |
| N | 48.0 | 18.9 | 133.3 | 106.2 | 136.4 | 85 | high resistivity |

For instance, as seen from FIG. 3, dual phase particles with higher structure require higher degree of surface coverage with silica to show similar electrical performance. The electrical performance of the coatings with higher silica coverage and higher structure particles can be nearly matched with the dual phase particles that had lower structure and lower silica coverage. Therefore, one can control electrical properties of polymer composites by selecting dual phase particles with appropriate silica surface coverage (for example, see FIG. 3) or by selecting dual phase particles with the desired structure or by combination of both. Concentration of dual phase particles as a handle to adjust electrical resistivity has been discussed above. As noted above, any one, any two, or all three of these characteristics/features/parameters can be used to "dial in" a desired electrical resistivity in a filler-polymer composition for use in black matrix, black column spacer or other light shielding coating elements in an LCD. By using these features, one is able to achieve the desired electrical resistivity in the filler-polymer composition and has an opportunity to adjust other important properties, for example optical density. For black matrices and black column spacers, for example, higher electrical resistivity can be provided.

Figure 5:
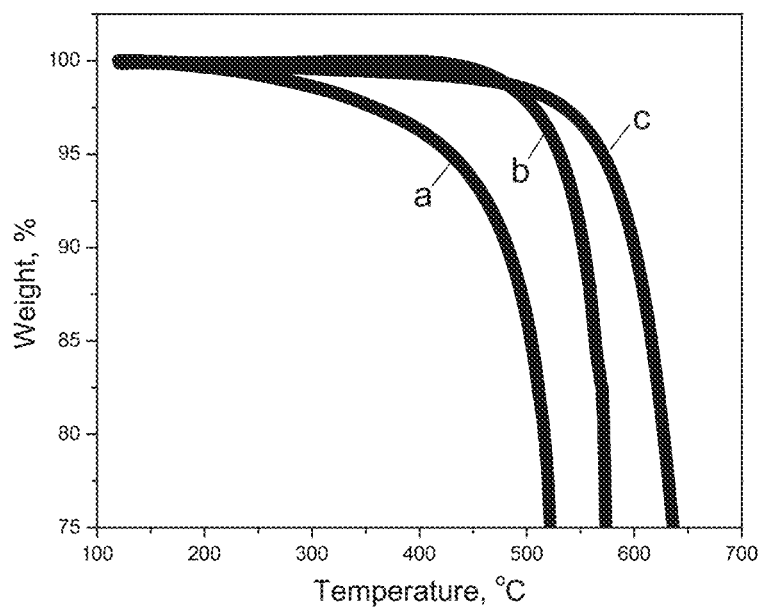
FIG. 5 is a graph showing thermogravimetric curves of particle weight loss in the presence of air (the first 25 wt % loss is shown): a—oxidized carbon black; b—carbon black; c—dual phase filler (sample N).

The present invention is especially useful in polymer compositions that require a processing or post-processing temperature of 150° C. or more, 200° C. or more, or 300° C. or more, or other values. The filler-polymer compositions of the present application can be exposed to such elevated processing temperatures in the manufacture of a black matrix, black column spacer or other light shielding coating elements in an LCD such as during a baking step applied to the coated filler-polymer composition, for example, or other processing or post-processing steps used in making a UV-curable coating, cured coating, black matrix, black column spacer, other light shielding coating elements or device incorporating them. Thermogravimetric analysis of a dual phase filler in the presence of air is shown in FIG. 5. There was no appreciable weight loss in a dual phase filler up to 500° C. On the contrary, it is well known that oxidized carbon blacks and carbon blacks with chemically attached or physically adsorbed organic or polymeric moieties start losing attached or adsorb functional groups at temperatures as low as 150° C. As a result, any benefits that such chemically attached or adsorb groups could bring to control resistivity of filler-polymer composites (or other performance parameters) are not realized or not fully realized once the filler-polymer formulation or composite is subjected to elevated temperatures. The present invention overcomes this disadvantage by using/selecting appropriate dual phase filler, and achieves good thermal stability and a desired and/or consistent electrical resistivity, even after subjecting the filler containing polymer formulation or filler-polymer composite to temperatures of 150° C. (or more) and/or subjecting the composition up to a temperature where polymer degradation may occur. A UV curable coating, cured coating, black matrix, black column spacer or other light shielding coating elements can be prepared with the coating film containing the dual phase filler-polymer composition of the present application, wherein the dual phase filler has good thermal stability when exposed at elevated temperature (e.g., a baking step) and/or exposed to several temperature cycles during a process of making the UV curable coating, cured coating, black matrix, black column spacer or other light shielding coating elements. The good thermal stability of the dual phase filler can be provided while also providing useful electrical resistivity and color functions. The filler-polymer compositions of the present application may permit the use of more aggressive baking conditions or other higher temperature processing conditions. This can provide a more robust and/or faster manufacturing process for UV curable coating, cured coating, black matrix, black column spacer or other light shielding coating elements in an LCD. Examples of polymers and resins, e.g., thermoplastic, thermoset components, have been described earlier and apply equally here, but are not limited to those mentioned. Acrylic resin, for example, can be used, and/or other resins that are curable. The choice of polymer(s) would largely depend upon the intended application in a UV curable coating, cured coating, black matrix, black column spacer or other light shielding coating elements in LCD.

Accordingly, the present invention includes a polymer composition as described herein (above or below) for a UV curable coating, cured coating, black matrix, black column spacer or other light shielding coating elements in an LCD, wherein the electrical resistivity of the filler-polymer composition is maintained upon thermal processing or post-processing of the filler-polymer composition at temperatures up to the thermal stability of the polymer(s) present in the filler-polymer composition. The electrical resistivity of the filler-polymer composition can be maintained upon thermal processing or post-processing of the filler-polymer compositions.

As a specific example, a polymer composition for use in a black matrix can be formed comprising at least one polymer and at least one dual phase filler which has a total sulfur amount of about 10000 ppm or less, about 5000 ppm or less, 500 ppm or 300 ppm or less. The polymer can be any one or more of the polymers as indicated above. For instance. FIG. 4 shows percolation curves for filler-polymer composites as a function of filler loading, where the sulfur content is less than 300 ppm.

As an option, the dual phase filler (in any embodiment or aspect of the present invention) can have attached at least one chemical group, such as one or more silanes, or one of more chemical groups that contain Si, or surface-modification groups via diazonium chemistry, or other chemical groups, or any combinations thereof. The chemical group that optionally can be attached onto the dual phase filler can be by any attachment means, such as covalent bonding, absorption, hydrogen bonding, and the like. In general, different surface treating agents can react differently with the carbon and silica portions of the particle surface.

For example, the carbon-silica dual phase particles may be modified to attach a chemical group, for example, an organic group, preferentially to the carbon portion of the surface. Such modified carbon-silica dual phase particles may be prepared with a method known to those skilled in the art. Such modified carbon-silica dual phase particles can be prepared, for example, by methods disclosed in U.S. Pat. Nos. 5,554,739, 5,707,432, 5,837,045, 5,851,280, 5,885,335, 5,895,522, 5,900,029, 5,922,118, 6,042,643, 6,337,358, 6,350,519, 6,368,239, 6,372,820, 6,551,393, and 6,664,312, International Patent Application Publication WO 99/23174, and U.S. Patent Application Publication 2006/0211791. In such methods, the organic group or other material being attached to the carbon-silica dual phase particles and the carbon-silica dual phase particles are combined. An aqueous solution of a nitrite and an acid are then added separately or together to generate the diazonium reaction and form the diazonium salt, which reacts with the carbon surface of the carbon-silica dual phase particles. This generation of the diazonium salt is preferably accomplished in situ with the carbon-silica dual phase particles. In the diazonium reaction, the primary amine group will react via a diazonium salt to form nitrogen gas or other by-products, which will then permit the organic group to attach onto the pigment. Other methods for preparing the modified carbon-silica dual phase particles include reacting carbon-silica dual phase particles having available functional groups with a reagent including the organic group. Such modified carbon-silica dual phase particles may also be prepared using the methods described in the references discussed above.

When the carbon-silica dual phase particles have at least one organic group attached thereto, the organic group may be an aliphatic group, an aromatic group, a heterocyclic group, or a heteroaryl group. The organic group may be substituted or unsubstituted. Aliphatic groups are hydrocarbon-based groups which may contain from 1 to about 20 carbon atoms and may be saturated (i.e., alkyl groups) or may contain one or more unsaturated sites (i.e., alkenyl and/or alkynyl groups). The aliphatic groups can be branched or unbranched and can be acyclic or cyclic. Non-limiting examples of suitable acyclic aliphatic groups include alkyl groups, alkenyl groups, and alkynyl groups. Non-limiting examples of suitable cyclic aliphatic groups include cycloalkyl groups (e.g., cyclopropyl, cyclobutyl, cyclopentyl, cyclohexyl, cycloheptyl, cyclooctyl, and the like) and cycloalkenyl groups (e.g., cyclopentenyl and cyclohexenyl). The term "aromatic group" refers to an unsubstituted or substituted aromatic carbocyclic substituent, as commonly understood in the art, and includes phenyl and naphthyl groups. The term "heterocyclic," as used herein, refers to a monocyclic or bicyclic 5- or 6-membered ring system containing one or more heteroatoms selected from O, N, or S, and combinations thereof. The heterocyclic group can be any suitable heterocyclic group and can be an aliphatic heterocyclic group, an aromatic heterocyclic group, or a combination thereof. Aromatic heterocyclic groups are referred to herein as heteroaryl groups. The heterocyclic group can be a monocyclic heterocyclic group or a bicyclic heterocyclic group. Suitable bicyclic heterocyclic groups include monocyclic heterheterocyclic ocyclyl rings fused to a $C_6$-$C_{10}$ aryl ring. When the heterocyclic group is a bicyclic heterocyclic group, both ring systems can be aliphatic or aromatic, or one ring system can be aromatic and the other ring system can be aliphatic as in, for example, dihydrobenzofuran. Non-limiting examples of suitable heteroaryl groups include furanyl, thiopheneyl, pyrrolyl, pyrazolyl, imidazolyl, 1,2,3-triazolyl, 1,2,4-triazolyl, isoxazolyl, oxazolyl, isothiazolyl, thiazolyl, pyridinyl, pyrimidinyl, pyrazinyl, triazinyl, benzofuranyl, benzothiopheneyl, indolyl, quinolinyl, isoquinolinyl, benzimidazolyl, benzoxazolinyl, benzothiazolinyl, and quinazolinyl.

Alternatively or in addition, the carbon-silica dual phase particles may be treated with an agent that associates preferentially with the silica surface, for example, a silica-treating agent. The silica-treating agent can be any suitable silica-treating agent and can be covalently bonded to the surface of the carbon-silica dual phase particles or can be present as a non-covalently bonded coating, which coating may also coat the carbon portion of the surface. Typically, the silica-treating agent is bonded either covalently or non-covalently to the silica-containing phase of the carbon-silica dual phase particles. The silica-treating agent can comprise a hydrophobizing silane. For example, the silica-treating agent can be a compound of the formula: $R_{4-n}SiX_n$ wherein n is 1-3, each R is independently selected from hydrogen, a $C_1$-$C_{18}$ alkyl group, a $C_3$-$C_{18}$ haloalkyl group, or a $C_6$-$C_{14}$ aromatic group, and each X is independently a $C_1$-$C_{18}$ alkoxy group or halo. The silica-treating agent can comprise a functionalized silane. The functionalized silane can comprise at least one functional group selected from acrylate, methacrylate, amino, anhydride, epoxy, halogen, hydroxyl, sulfur, vinyl, isocyanate, or any combinations thereof.

The silica-treating agent can be a silicone fluid. The silicone fluid can be a non-functionalized silicone fluid or a functionalized silicone fluid. Non-limiting examples of useful non-functionalized silicone fluids include polydimethylsiloxanes, polydiethylsiloxanes, phenylmethylsiloxane copolymers, fluoroalkylsiloxane copolymers, polyalkylene oxide modified silicones, cyclic polysiloxanes of the D3, D4, and D5 types, and the like. Functionalized silicone fluids can comprise, for example, functional groups selected from vinyl, hydride, silanol, amino, or epoxy. The silica-treating agent can comprise a silazane, for example, the silica-treating agent can be hexamethyldisilazane, octamethyltrisilazane, a cyclic silazane, and the like.

Alternatively or in addition, the carbon black phase of the dual phase filler particles may be modified by oxidation of the carbon phase by contacting the dual phase filler particles with at least one oxidation agent, such as those known in the art, such as nitric acid, ozone, hydrogen peroxide, sodium hypocholoride, and the like.

The dual phase filler can have any structure, for instance, the dual phase filler can have an OAN between about 50 cc/100 g filler to about 200 cc/100 g filler, an OAN of 140 cc/100 g filler, an OAN of 50 to 140 cc/100 g filler, or an OAN of 141 to 200 cc/100 g filler, or any combination of various dual phase fillers having different OANs.

Furthermore, with the present invention, a filler-polymer composition for use in black matrix can have an electrical resistivity, where the electrical resistivity changes an order of magnitude of 2 or less at a loading of from 5 to 35 wt % (based on the weight of the filler-polymer composition). The OAN number for the filler can be about 50 g/100 g filler or higher and can include any one of the OAN numbers provided earlier herein. This order of magnitude can be 2 or less, 1.7 or less, 1.5 or less, 1.4 or less, 1.2 or less, 1 or less, 0.8 or less, 0.6 or less, 0.4 or less, or 0.2 or less, such as from 0.1 to 2 or 0.5 to 1.5, and the like. The ability to maintain consistent electrical resistivity across a range of loading levels offers significant advantages to end users when forming resistive filler-polymer compositions. This is shown, for instance, in the upper part of FIG. 2 and FIG. 4 (acrylic composites), which had a slight change in electrical resistivity (both surface and volume) over various loading levels and on an order of magnitude of 2 or less. For instance, this can be achieved with dual phase fillers, such as ones having a silica phase surface coverage above 70%, above 80%, above 85%, from 80% to 95%, and the like. This can also be achieved with a combination of lower silica surface coverage and lower particle structure. Therefore, filler-polymer compositions of this invention enable electrically resistive composites and compositions for black matrices, black column spacers and other light shielding coatings elements in an LCD, and products or devices that include therewith.

As shown in FIG. 2, resistivity of a composite based on a conventional carbon black decreased dramatically over the short range of carbon loading amount in the filler-polymer composite. The methods of the present invention overcome this problem by using/selecting a dual phase filler as described herein, and which can include ones with high silica surface coverage. For instance, it has been found that depending on dual phase filler morphology the silica surface coverage of about 50% or more or 80% or more was sufficient to maintain electrical resistivity over the broad range of filler concentration in the finished composition or composite in a black matrix and achieve a change of electrical resistivity of less than a factor of 1 or 2 over the very wide range of filler loading amount. As an option, the steady electrical resistivity of the filler-polymer composition can even be substantially the same as the electrical resistivity of the same polymer (in the filler-polymer composition) without any filler, and be less than an order of magnitude of 2 compared to the neat polymer (with no filler). This is particularly impressive given that a finished composition based on a conventional carbon black (with identical surface area and structure) percolated at filler concentrations of about 10 wt % and had a volume resistivity of about 9 orders of magnitude lower than that based on a dual phase filler and/or neat polymer. Thus, the present invention enables precise control of electrical resistivity in the finished compositions or composites for a black matrix, black column spacers or other light shielding coating elements in an LCD even at varying filler loadings. Moreover, the present invention enables formulation of highly resistive composites with a wide range of filler amount. The latter is important to obtain the black matrices, black column spacers or other light shielding coating elements in an LCD with suitable light shielding characteristics since the optical density of a coating layer is determined by the amount of the filler particles and their extinction properties.

Furthermore, it has been surprisingly found that dielectric properties of composites comprising dual phase fillers are controlled by the silica coverage of the dual filler particles. Specifically, the filler-polymer composites with higher silica coverage filler were effective to substantially lower the dielectric constant of the composites. This discovery along with the ability of the dual phase filler particles to make highly resistive and optically dense coatings opens an opportunity to overcome the material challenges brought by the requirements of next generation black matrices, color filter on array (COA) designs, black color spacers and other light shielding coating elements in LCD. As shown in the examples provided herein, silica-carbon black dual phase fillers can be used to make coatings that possess high electrical resistivity, low dielectric constant and adequate optical density.

With the present invention, any one or more of conventional or optional additional ingredients used in filler-polymer compositions for forming UV-curable films and cured films in black matrices, black column spacers or other light shielding coating elements in LCD can be used herein, for instance at the conventionally used amounts.

UV-curable coating compositions used to form black matrices, black column spacers or other light shielding coating elements of the present invention can be prepared, for example, with the above-described dual phase filler, polymer and vehicle to provide stable dispersions that can be used in coatings that form curable films. Optionally, at least one suitable dispersant aid can be added to the formulation to facilitate dispersion of the dual phase filler to aggregate level. This can permit the preparation of UV curable coatings, cured coatings, black matrices, black column spacers or other light shielding coating elements having improved overall properties and performance, including improved balance of electrical properties, such as high surface resistivity, and/or low dielectric constant, and/or high optical density, or any combinations of these. Surface resistivity is a measure of the resistance to leakage current along the surface of an insulating material and can be measured using a variety of techniques known in the art including, for example, the method defined in ASTM procedure D257-93. Volume resistivity can be determined using ASTM D-257. For example, Keithley Application Note Number 314 "Volume and Surface Resistivity Measurements of Insulating Materials Using the Model 6517A Electrometer/High Resistivity Meter" describes the measurements of surface and volume resistivity in details. Optical density (OD) is a measure of the opacity of a material and is typically measured using a densitometer. OD is dependent on several factors, including the thickness of the film. Optical density can be measured with an X-RITE 361T densitometer (X-RITE, Grand Rapids, Mich., U.S.A.). The coatings of the present invention can have the above-described electrical resistivities, which can apply to curable, cured, or both forms of coatings of the present invention. The coatings of the present invention can have an optical density of greater than or equal to about 1 per 1 µm of coating thickness, and a surface resistivity greater than or equal to about $10^{12}$ Ohms/sq, or greater than or equal to about $10^{13}$ Ohms/sq, or greater than or equal to about $10^{14}$ Ohms/sq, or greater than or equal to about $10^{15}$ Ohms/sq, or from about $10^{12}$ Ohm/sq about $10^{16}$ Ohm/sq, or from about $10^{12}$ Ohm/sq about $10^{15}$ Ohm/sq, or from about $10^{12}$ Ohm/sq about $10^{14}$ Ohm/sq, or other values. These optical density values can apply to curable, cured, or both forms of coatings of the present invention. Coatings of the present invention can have volume resistivities, for example, which are the same as the indicated range values for surface resistivities, or other values (e.g., per 1 micron coating thickness). The coatings of the present invention may have similar electrical properties (such as resistivity) at greater film thicknesses, including, for example, 1-250 micron (µm) thickness, or from 10-100 micron thickness, or from 20-50 micron thickness, or from 1-4 micron thickness or other thicknesses, depending on the application of the coating. The present invention relates also to curable coating compositions, curable coatings, and cured coatings comprising modified organic black pigments, and black matrices that can be formed therefrom. UV curable coatings, cured coatings, black matrices, black column spacers and other light shielding coating elements in an LCD containing these products can have a surface resistivity and/or optical density such as indicated above. The black matrices can have a dielectric constant k of less than 20, or less than 19, or less than 18, or less than 17, or less than 16, or less than 15, or less than 14, or less than 13, or less than 12, or less than 11, or less than 10, or less than 5, or from 1 to less than 20, or from 5 to less than 20, or from 10 to less than 20, or from 5 to 15, or other values. These dielectric constant values can apply to curable, cured, or both forms of coatings of the present invention. The dielectric constant measurements can be measured, for example, with Solartron 1260A Impedance/Gain-phase Analyzer (FRA) complemented with 1296A Dielectric Interface (Solartron Analytical). The frequencies of interest under which the capacitance measurements are made for determining a dielectric constant of coatings for black matrix applications can range from 100 Hz to 1 MHz. The selection of a more specific dielectric constant value below 20 may take into consideration factors, such as whether an organic layer is formed on the black matrix where used in a color filter on transistor type LCD device. For example, a dielectric constant less than 20 may be used where no organic layer is formed on the black matrix in such an LCD device, whereas the dielectric constant may be selected to be less than 10 where an organic layer is formed on the black matrix, such as to minimize signal delays or other problems in the device.

Figure 6:
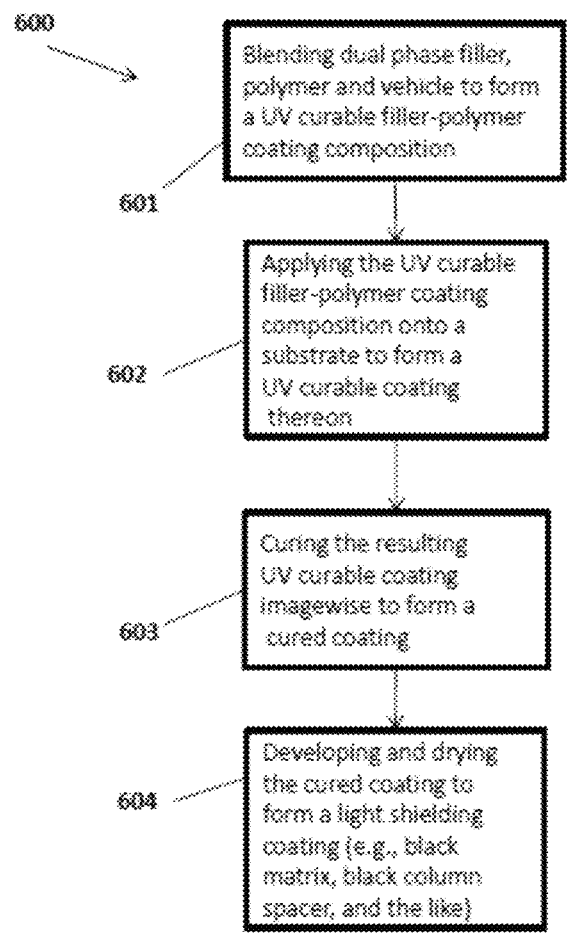
FIG. 6 is a flow chart which shows a method of the present application.

The present invention further relates to a method of making a UV-cured coating, black matrix, black column spacer or other light shielding coating elements. For example, and as illustrated in FIG. 6, a method is generally indicated by process flow (600) which can be used for making a UV curable coating, cured coating, black matrix, black column spacer or other light shielding coatings. The process can comprise steps of blending dual phase filler, polymer and vehicle to form a curable filler-polymer coating composition (601), then applying the curable filler-polymer coating composition onto a substrate to form a curable coating thereon (602), curing the resulting curable coating imagewise (603), and developing and drying the cured coating to form a UV cured coating, black matrix, black column spacer or other light shielding coatings (604). Alternatively to step 601, a dispersion of dual phase filler with vehicle and optional dispersing aid can be made first and then combined with a curable polymer and other additives. Dispersing aids are additives that can enhance the dispersibility of pigments/particles in solvents or aqueous medium. Polymer based dispersing aids are normally used in organic solvents. These polymeric dispersant aids typically have pigment affinity groups which interact with the pigment surface. They may also contain long chain polymers that are soluble in the solvent and thus provide steric stabilization of pigment particles. Commonly used dispersing aids include, for example, Disperbyk®-161 and Disperbyk®-163 from BYK Chemie, Solsperse® 24000, Solsperse® 37500, Solsperse® 35100 from Lubrizol Ltd. The UV cured coating, black matrix, black column spacer or other light shielding coatings can be prepared from the curable coating composition or other filler-polymer compositions such are described in more detail above and in the examples herein. Surface resistivity and optical density, for example, can be important properties for black matrix materials. Since the UV cured coating, black matrix, black column spacer or other light shielding coatings of the present invention can be formed, for example, from the curable filler-polymer coating compositions of the present invention, which can be used to form a cured coating of the present invention, the UV curable coating, cured coating, black matrix, black column spacer or other light shielding coatings can have performance properties (surface resistivity and optical density) such as described above in relationship to the coating. The total amount of the dual phase filler in the described coatings of the present invention can comprise the values indicated above. A single type or more than one type of dual phase filler can be used in any polymer composition used in a UV curable coating, cured coating, black matrix, black column spacer or other light shielding coatings.

The present invention further relates to a liquid crystal display device that contains a UV curable coating, cured coating, black matrix, black column spacer or other light shielding coatings as described herein. The present invention further relates to a color filter which can be used in combination with a black matrix as described herein. The color filter can be formed using any method known in the art and, in particular using a method that incorporates formation of a black matrix component such as described above. For this application, pigments can be used which correspond in color to the colors needed for the pixels of the display device. The present invention also relates to a color filter on array (COA) structure comprising at least one thin film transistor (TFT) array formed on a substrate, and an infrared or near-infrared radiation-transparent layer located directly on the array, wherein the radiation-transparent layer can comprise the black matrix such as indicated above. The present invention also relates to a liquid crystal display device comprising the color filter on array structure such as indicated herein.

Figure 7A:
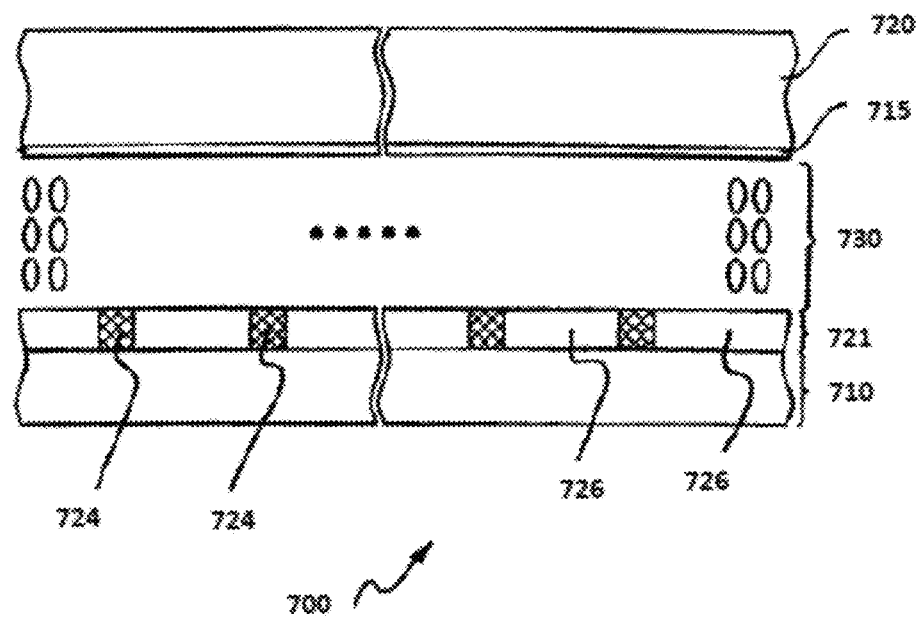
FIG. 7A is a schematic view of a liquid crystal display device including a black matrix layer, according to an example of the present application.

Referring to FIG. 7A, for example, a liquid crystal device 700 according to the present invention is shown that can be made with a color filter on array (COA) technique which incorporates a black matrix component. A color filter 721 is formed on an active device array substrate 710 (e.g., a TFT array substrate). The color filter 721 includes black matrix 724 and a plurality of color filter thin films 726. Generally speaking, the material of the color filter thin film regions 726 can be red, blue, or green resins. A liquid crystal layer 730 is disposed between the color filter 721 and an opposite transparent insulation substrate 720. Patterned electrodes 715 can be provided on the side of the opposite substrate 720 which faces layer 730. The color filter 721 can be formed on active device substrate 710, for example, using photolithographic methods, inkjet printing, or combinations of these techniques such as known in the art. For example, the black matrix 724 can be formed as patterned negative photosensitive back resin layer, and the color filter regions 726 can be formed as patterned photosensitive color filter layer regions and/or by ink jet printing. The design and fabrication of the active device array substrate 710 (e.g., a TFT array substrate) can be conventional or any configuration suitable for use in combination with color filters made with a black matrix composition such as disclosed herein. Other components not shown can be included in the liquid crystal device which is conventionally used in and with such devices. The formation of a color filter including a black matrix which contains the surface modified organic black pigment and optional carbon black on a TFT array can be provided, for example, using process steps and arrangements such as disclosed and shown in U.S. Pat. Nos. 7,773,177 B2, 7,439,090 B2; 7,436,462 B2; and 6,692,983 B1, and U.S. Patent Application Publication Nos. 2007/0262312 A1 and 2011/0005063 A1, which are incorporated herein by reference in their entireties.

Figure 7B:
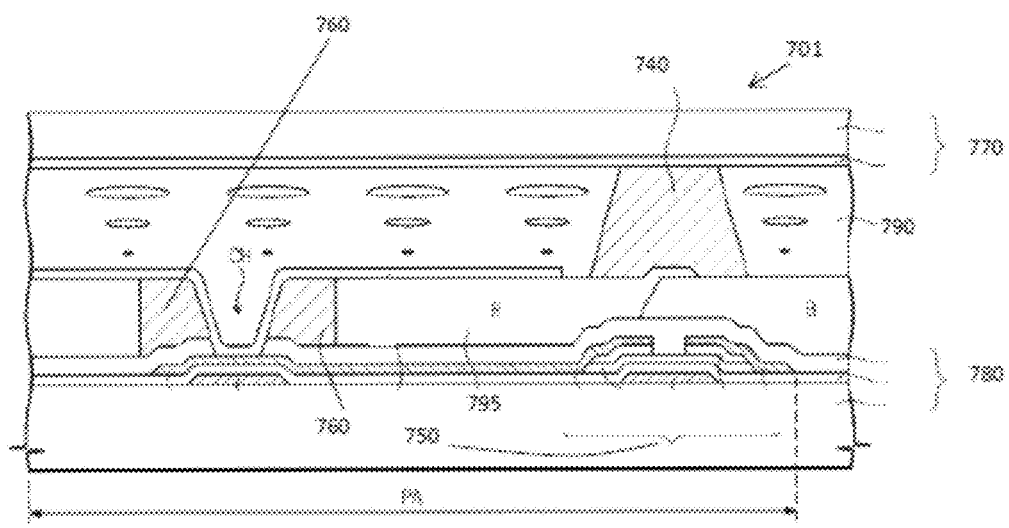
FIG. 7B is a schematic view of a liquid crystal display device including black column spacer and black matrix layers.

Referring to FIG. 7B, for example, a liquid crystal device 701 according to the present invention is shown that can be made with a black color spacer, and a black matrix. A spacer 740 is formed in each pixel area and arranged on the thin film transistor 750. The spacer 740 may include the same material as a black matrix 760 and may be formed through the same process as the black matrix 760. When column spacers are black, they are also called black column spacer. Since each spacer 750 and black matrix 760 may include the same material, the opposite substrate 770 may not require a separate black matrix to prevent the thin film transistor 750 from being recognized from the outside. As a result, the number of manufacturing processes may be decreased and misalignment between the array substrate 780 and the opposite substrate 770 may be prevented. Layer 790 indicates a liquid crystal layer, 795 is a color filter (e.g., a red (R), blue (B), or green color filter), CH is a contact hole, and PA is a pixel area. Other components of LCD 701 can include those such as shown in the indicated U.S. Patent Application Publication No. 2011/0005063 A1.

The present invention includes the following aspects/embodiments/features in any order and/or in any combination:

1. The present invention relates to a UV-curable coating comprising a filler-polymer composition comprising:
at least one polymer and at least one filler, said filler comprising:
a) a controlled amount of a dual phase filler having a silica phase and a carbon phase, or
b) a dual phase filler having a silica phase and a carbon phase, wherein said silica phase is a controlled surface coverage amount of the silica phase, or
c) a dual phase filler having a silica phase and a carbon phase, wherein said dual phase filler has a controlled morphology; or
d) any combination of a), b), and c).

2. The coating of any preceding or following embodiment/feature/aspect, wherein the cured coating is a black matrix.
3. The coating of any preceding or following embodiment/feature/aspect, wherein the cured coating is a black column spacer.
4. The coating of any preceding or following embodiment/feature/aspect, wherein the cured coating is a component of a light shielding coating element in an LCD device.
5. The coating of any preceding or following embodiment/feature/aspect, wherein the dual phase filler comprises fused primary particles with an average aggregate size of less than 250 nm and an average primary particle size of 50 nm or less.
6. The coating of any preceding or following embodiment/feature/aspect, wherein dual phase filler has less than 1% weight loss when subjected to the temperature from 120° C. up to 450° C. in air with a temperature ramp of 5 deg C. per minute.
7. The coating of any preceding or following embodiment/feature/aspect, wherein said electrical resistivity of said filler-polymer composition is maintained upon thermal processing or post-processing of said filler-polymer composition at temperatures up to thermal stability of said at least one polymer.
8. The coating of any preceding or following embodiment/feature/aspect, wherein said controlled amount is an amount selected from 1 wt % filler loading to 40 wt % filler loading.
9. The coating of any preceding or following embodiment/feature/aspect, wherein the coating has a surface resistivity of $10^6$ to $10^{16}$ Ohm/sq
10. The coating of any preceding or following embodiment/feature/aspect, wherein the coating has a surface resistivity of $10^{12}$ to $10^{16}$ Ohm/sq.
11. The coating of any preceding or following embodiment/feature/aspect, wherein said controlled surface coverage amount of the silica phase is from about 50% to about 99%, and wherein a higher controlled surface coverage amount provides a higher electrical resistivity in said coating.
12. The coating of any preceding or following embodiment/feature/aspect, wherein the coating has a dielectric constant of less than 20.
13. The coating of any preceding or following embodiment/feature/aspect, wherein the coating has an optical density of at least about 1 or more measured at a thickness of about 1 micron.
14. The coating of any preceding or following embodiment/feature/aspect, wherein said silica phase is present in an amount of 10 wt % to about 90 wt % based on the weight of the dual phase filler.
15. The coating of any preceding or following embodiment/feature/aspect, wherein said dual phase filler has attached at least one chemical group.
16. The coating of any preceding or following embodiment/feature/aspect, wherein said dual phase filler has attached at least one silane.
17. The present invention relates to a UV-curable coating comprising a polymer composition which comprises at least one polymer and a dual phase filler having a silica phase and a carbon phase, wherein said dual phase filler has an exposed outer surface area, and said silica phase comprises from about 50% to about 99% by surface area of said exposed outer surface area, wherein the coating has a resistivity of $10^{10}$ to $10^{16}$ Ohm/sq, a dielectric constant of less than 20, and an optical density of at least about 1 or more at a thickness of about 1 micron.
18. The coating of any preceding or following embodiment/feature/aspect, wherein the cured coating is black matrix.

19. The coating of any preceding or following embodiment/feature/aspect, wherein the cured coating is black column spacer.
20. The coating of any preceding or following embodiment/feature/aspect, wherein the cured coating is a component of a light shielding element in an LCD device.
21. The coating of any preceding or following embodiment/feature/aspect, wherein said silica phase is 50% to 90% by surface area of said exposed outer surface area.
22. The coating of any preceding or following embodiment/feature/aspect, wherein said silica phase is 50% to 80% by surface area of said exposed outer surface area.
23. The coating of any preceding or following embodiment/feature/aspect, wherein said silica phase is 50% to 70% by surface area of said exposed outer surface area.
24. The coating of any preceding or following embodiment/feature/aspect, wherein said polymer is at least one curable polymer.
25. The coating of any preceding or following embodiment/feature/aspect, wherein said dual phase filler has attached at least one chemical group.
26. The coating of any preceding or following embodiment/feature/aspect, wherein said at least one chemical group is a silane.
27. The coating of any preceding or following embodiment/feature/aspect, wherein said dual phase filler has an OAN of 50 to 140 cc/100 g filler.
28. The coating of any preceding or following embodiment/feature/aspect, wherein said dual phase filler has an OAN of 141 to 200 cc/100 g filler.
29. The present invention relates to a UV-curable coating comprising a polymer composition which comprises:
   a) at least one polymer, and
   b) at least one dual phase filler having an exposed outer surface area, wherein said dual phase filler has an OAN between 50 cc/100 g to 200 cc/100 g filler, a silica content of 10 wt % to 90 wt %, and said silica phase comprises from about 50% to about 99% by surface area of said exposed outer surface area.
30. The coating of any preceding or following embodiment/feature/aspect, wherein the cured coating is a black matrix.
31. The coating of any preceding or following embodiment/feature/aspect, wherein the cured coating is a black column spacer.
32. The coating of any preceding or following embodiment/feature/aspect, wherein the cured coating is a component of a light shielding element in LCD device.
33. The coating of any preceding or following embodiment/feature/aspect, wherein the polymer composition comprises a cured composition.
34. The coating of any preceding or following embodiment/feature/aspect, wherein the coating has a surface resistivity of $10^{10}$ to $10^{16}$ Ohm/sq.
35. The coating of any preceding or following embodiment/feature/aspect, wherein the coating has a dielectric constant of less than 20.
36. The coating of any preceding or following embodiment/feature/aspect, wherein the coating has an optical density of at least about 1 or more at a thickness of about 1 micron.
37. The present invention relates to a UV-curable coating comprising:
   a) at least one UV-curable polymer, and
   b) at least one dual phase filler having an exposed outer surface area, wherein said dual phase filler has an OAN from about 50 to about 200 cc/100 g filler, a silica content of 10 wt % to 90 wt %, and said silica phase comprises from about 50% to about 99% by surface area of said exposed outer surface area, where the electrical surface resistivity changes an order of magnitude of 2 or less over loading levels from 5 wt % to 35 wt % in the polymer composition.
38. The coating of any preceding or following embodiment/feature/aspect, wherein the cured coating is a black matrix.
39. The coating of any preceding or following embodiment/feature/aspect, wherein the cured coating is a black column spacer.
40. The coating of any preceding or following embodiment/feature/aspect, wherein the cured coating is a component of a light shielding element in LCD device.
41. The coating of any preceding or following embodiment/feature/aspect, wherein the electrical resistivity of said polymer composition and electrical resistivity of a polymer composition with said at least one polymer without any filler changes an order of magnitude 2 or less over said loading levels.
42. A liquid crystal device comprising a cured UV-curable coating of any preceding or following embodiment/feature/aspect.
43. A black matrix comprising a cured coating of any preceding or following embodiment/feature/aspect.
44. A black column spacer comprising a cured coating of any preceding or following embodiment/feature/aspect.
45. A component of a light shielding coating element in an LCD device comprising a cured coating of any preceding or following embodiment/feature/aspect.
46. A liquid crystal device comprising a cured coating of any preceding or following embodiment/feature/aspect.
47. The present invention relates to a method of making a UV-cured coating comprising:
   (i) combining at least one polymer with at least one filler and vehicle to provide a UV-curable filler-polymer composition, said filler comprising:
      a) a controlled amount of a dual phase filler having a silica phase and a carbon phase, or
      b) a dual phase filler having a silica phase and a carbon phase, wherein said silica phase is a controlled surface coverage amount of the silica phase, or
      c) a dual phase filler having a silica phase and a carbon phase, wherein said dual phase filler has a controlled morphology; or
      d) any combination of a), b), and c);
   (ii) applying the curable filler-polymer composition onto a substrate to form a UV-curable coating;
   (iii) curing the coating imagewise to form a cured coating; and
   (iv) developing and drying the cured coating.
48. A method of making a UV-cured coating of any preceding or following embodiment/feature/aspect, wherein the cured coating is a black matrix.
49. A method of making a UV-cured coating of any preceding or following embodiment/feature/aspect, wherein the coating is a black column spacer.
50. A method of making a UV-cured coating of any preceding or following embodiment/feature/aspect, wherein the coating is a component of a light shielding element in LCD device.
51. The present invention relates to a dispersion comprising:
   a) at least one solvent;
   b) at least one dual phase filler having an exposed outer surface area, and said silica phase comprises from about 10% to about 99% by surface area of said exposed outer surface area; and
   c) optionally, a dispersing aid.

52. A dispersion of any preceding or following embodiment/feature/aspect, wherein the solvent is propyleneglycol monomethylether acetate.

53. UV curable coating comprising the dispersion of any preceding or following embodiment/feature/aspect.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLE 1

Polymer-filler formulations were evaluated for use in forming black matrices. Several acrylic formulations were prepared to evaluate electrical properties and ability to tune the electrical properties of the coatings with various dual phase particles. Dual phase particles with 85% silica coverage, 50% silica coverage, and 30% silica coverage were selected along with a commercial carbon black (Vulcan® 7H, Cabot Corporation) that had similar morphology (OAN was 125 mL/100 g) for the comparative study. The commercial carbon black had 0% silica coverage.

For each filler sample, polymer composites were prepared with acrylic resin NeoCryl B-814 from DSM NeoResins. Methyl ethyl ketone (MEK) was used as the solvent. In several experiments, the NeoCryl B-814 acrylic resin was replaced with Joncryl 611 acrylic resin (commercially available from Johnson Polymers).

MEK solvent dispersions (mill bases) were prepared in Scandex paint shaker. Let down dispersions that had desired mass ratio of the dual phase filler particle to acrylic resin were prepared and coated on steel Q-plates with a 3 mil draw down bar. Films were initially air-dried in a hood, followed by oven drying at 120° C.

Volume and resistivity measurements were obtained according to the procedure described in ASTM D257-93 using a Keithley 6517 Electrometer equipped with ETS resistance probe 803B. The voltage for measuring resistance was 5V. Surface resistivity values were taken directly from the computer.

FIG. 2 depicts surface electrical resistivity of the obtained acrylic films and demonstrates the capability of the method proposed herein to make films with the targeted electrical resistivity independently from the loading of the particles. In other words, the amount of silica phase surface coverage on the filler controlled resistivity. These results further show that the dual phase filler-polymer compositions can be used to make composite films having high electrical resistivity and other properties applicable to forming black matrices, black column spacers or other light shielding coating elements in LCD.

EXAMPLE 2

A thermogravimetric study was conducted on a carbon black, surface oxidized carbon black and a dual phase filler having about 85% surface area that is a silica phase. FIG. 5 depicts the results of thermogravimetric analysis in the presence of air. As can be seen, the oxidized carbon black started losing weight as early as 200 deg C. (200° C.) with the steep acceleration of weight loss (burning) at about 500 deg C., conventional carbon black was stable up to about 500 deg C. followed by the steep weight loss, whereas dual phase particles were thermally stable at a variety of high temperatures, include 300 deg C., 450 deg C., and at least 550 deg C. The point for steep acceleration of weight loss for dual phase particle was at about 600 deg C.

EXAMPLE 3

In this example, the evaluation of silica-carbon black dual phase particles of the present application was conducted using a standard method that includes preparation of a millbase, let-down and coating forming steps.

The dual phase particles with 50% silica coverage and 90% silica coverage were selected along with a carbon black that had similar morphology (OAN was 140 mL/100 g and BET surface area was 130 m²/g) for the comparative study.

Briefly, the millbases of particles with Joncryl 611 acrylic resin (commercially available from Johnson Polymers) in PGMEA solvent were prepared by milling the components with 2 mm glass beads during 4 hours on Scandex SO-400. The resulting dispersions were filtered from glass media and letdown with additional Joncryl 611 and PGMEA to make a series of formulations with particle concentration ranging from 5 to 30 wt % on the dry basis. After additional mixing for 30 min, the final formulations were spin coated onto glass wafers and baked at 100° C. The optical and electrical properties of the resulting films were measured.

Specifically, the optical density was measured using a X-Rite 361T Transmission Densitometer, and the film thickness was measured using a KLA Tencor Alpha Step 500 Surface Profilometer. The surface resistivity of the coatings was measured using a Keithley Model 6517 Electrometer/High Resistance Meter.

Figure 8:
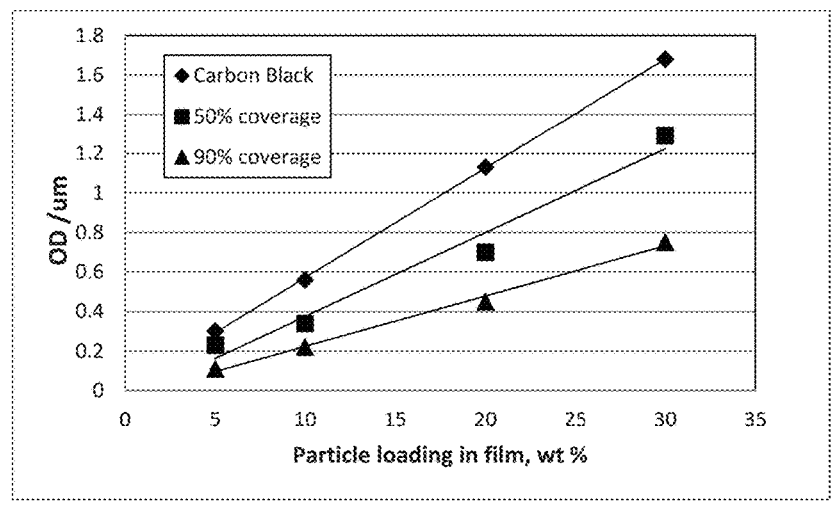
FIG. 8 shows an optical density (OD) of a film normalized to one micron (μm) as a function of particle concentration (wt %) in the films for dual phase fillers having 50% and 90% silica surface coverage, according to an example of the present application, and the results for carbon black with similar morphology which are shown for comparison.
Figure 9:
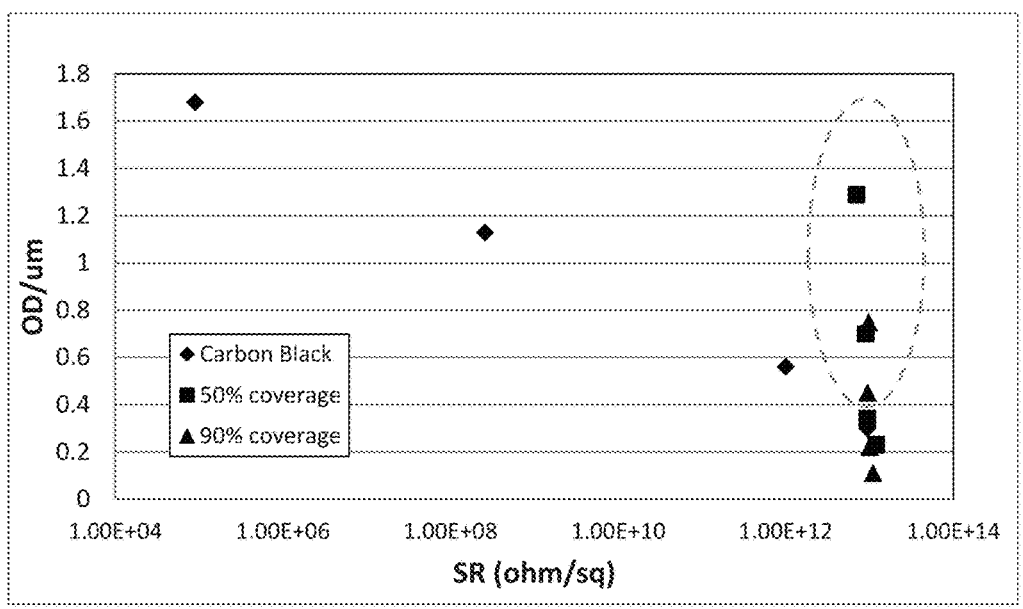
FIG. 9 shows a plot of optical density versus surface resistivity (SR, Ohm/sq) of films containing dual phase silica-carbon black particles having 50% and 90% silica surface coverage according to an example of the present application, and the results for carbon black with similar morphology which are shown for comparison.

FIG. 8 shows the optical density of the film normalized to one micron as a function of particle concentration in the coatings. FIG. 9 shows a plot of optical density versus surface resistivity of the coatings containing dual phase silica-carbon black particles. The results for carbon black with similar morphology are shown for comparison.

Although the presence of silica in dual phase particles can negatively influence particle extinction, as shown on FIG. 8, silica surface domains provides a way to control resistivity with sufficient color function still provided for use in black matrix, black column spacers or other light shielding coating elements in LCD. FIG. 9 demonstrates that high resistivity and good optical density can be reached with the dual phase particles having silica surface coverage equal to or above 50%. The coating comprising conventional carbon black with the same morphology was too conductive. These results demonstrate that coatings comprising silica-carbon black dual phase particles exhibit both high surface electrical resistivity and adequate optical density (e.g., see the area highlighted with the dashed line on FIG. 9). Conventional carbon black with the same particle morphology was outside of the desired performance range. It would be expected that these coatings would also have higher volume resistivity compared to coatings comprising conventional carbon black. While these examples use a resin that is not curable, it would be expected that similar performance would result if a curable resin, such as a photosensitive or thermosensitive resin, were used. Therefore, these coatings can be used as a UV curable coating, cured coating, black matrix, black column spacer or other light shielding coating element.

EXAMPLE 4

In this example, the dielectric constant was measured for two dual phase fillers with different exposed surface area amounts of the silica phase and two carbon blacks. Vulcan® XC-72 and Regal® 330 employed in the study were commercial carbon blacks from Cabot Corporation. The oil adsorption number (OAN) numbers for the carbon blacks were 175 and 74 mL/100 g respectively. The dual phase silica carbon black particles "E" and "N" were used in the study. The morphological characteristics of these particles are specified in Table 1.

A series of polyethylene-based composite was prepared through blending of low density polyethylene with selected particles in a Brabender Roller Blade mixer operated at 120° C. and 60 rpm. Each composite was hot-pressed at 120° C., 10000 PSI into 450 micron thick films. The films were placed directly in the sample holder (Model 12962A by Solartron Analytical) between two flat electrodes, which constitute the sample holder. The dielectric constant measurements were conducted with Solartron 1260A Impedance/Gain-phase Analyzer (FRA) which was also complemented with 1296A Dielectric Interface (Solartron Analytical).

Figure 10:
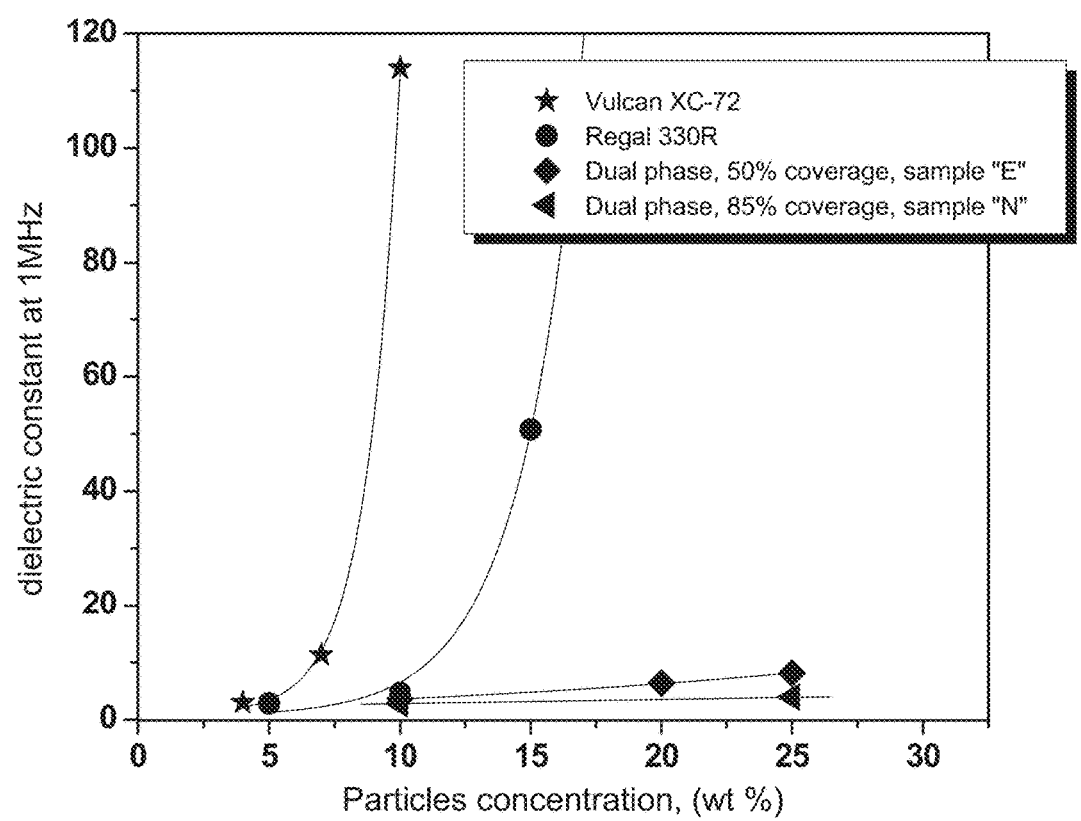
FIG. 10 is a graph showing the dielectric constant measured at 1 MHz for polyethylene-films containing various types of carbon black and dual phase fillers at several particles concentration (wt %).

FIG. 10 is a graph showing the dielectric constant measured at 1 MHz for polyethylene-filled base composites containing various particles. Vulcan XC-72 and Regal® 330 carbon blacks are untreated and had no silica surface coverage. Obtained dielectric constant results for the commercial carbon blacks as a function of filler concentration were consistent with those published in the literature, for example as has been shown in "Dielectric Behavior of Carbon Black Filled Polymer Composites", *Polymer Engineering and Science*, 1986, vol. 26, p. 1568-1573. Both dual phase fillers demonstrated lower dielectric constant values within the studied concentration range. As can be seen the dielectric constant can be controlled based on filler loading, as well as the amount of exposed silica phase on the surface of the dual phase filler. High silica coverage particles were more effective to reduce the dielectric constant of the composite. While these examples use a resin that is not cured, it would be expected that similar performance would result if a curable/cured resin, such as a photosensitive or thermosensitive resin, were used, e.g., a UV curable coating used to form a black matrix, black column spacer or other light shielding elements in an LCD.

EXAMPLE 5

In this example, the dispersions of the dual phase particles in propylene glycol methyl ether acetate (PGMEA) were prepared and used to make black photoresists and black matrix coatings.

Two pelleted dual phase particles (referred to as "O" and "P") were selected for this study. Both particles had similar BET surface area (138 m²/g and 133 m²/g respectively) and STSA area (113 m²/g and 117 m²/g respectively) but different silica surface coverage (72% and 50% respectively). The oil adsorption number (OAN) for particle "O" was 100 ml/100 g, whereas the OAN for "P" was 70 ml/100 g. Silica content for "O" and "P" particles was 45.7 wt % and 27.3 wt % correspondingly.

In order to prepare a millbase of the dual phase particles, 20 g of Solsperse 37500 (40 wt % active form dispersant in n-butyl acetate from Lubrizol Ltd.) was dissolved in 60 g of PGMEA. The obtained solution was combined with 20 g of dual phase particles and 100 g of 2 mm glass beads. The mixture was shaken in the lab shaker (model: Disperser DAS 200 from Lau GmbH) for 2 hours. After the process was completed the glass beads were separated and the obtained dispersion was analyzed to confirm that the particles were well dispersed. For example, the viscosity for 20 wt % particle P dispersion in PGMEA was 11 cP at 10 rpm as measured by the Brookfield rheometer (model: DV-III Ultra Programmable Rheometer). Dynamic light scattering method (model: Nanotrac™ 252) was used to determine particle size (Mv) in the millbase. The reported value for the dual particle P dispersion was 156 nm. Both sets of data showed that the dual phase particles were well dispersed in the millbase.

To make a black photoresist, the millbase of dual phase particles was added to Miphoto A photopolymer (Miwon Chemical, Korea). The ratio of the dual phase particles to photopolymer was varied to make formulations with the different amount of particles. PGMEA was added to dilute solutions if necessary. The obtained black photoresist was spun onto a glass wafer and soft baked at 110° C. for 90 seconds, following by the hard bake at 220° C. for 20 min. Optical density of the coatings was measured using X-RITE 361T densitometer (X-RITE, Grand Rapids, Mich., U.S.A.). Reported in Table 2 are the results of the dual phase particle loading in the obtained coatings and their corresponding optical density, thickness as well as the normalized optical density (OD/micrometer (μm)). As evident the curable coatings with the targeted optical density (OD~1-2/μm) can be produced.

TABLE 2

| Dual Phase Particle ID | Dual phase particle wt % in coatings | OD | Thickness (μm) | OD/μm |
|---|---|---|---|---|
| O | 10 | 0.65 | 1.83 | 0.36 |
| O | 20 | 1.27 | 1.88 | 0.68 |
| O | 30 | 1.96 | 1.66 | 1.18 |
| O | 40 | 2.87 | 1.96 | 1.47 |
| P | 10 | 0.77 | 1.79 | 0.43 |
| P | 20 | 1.43 | 1.52 | 0.94 |
| P | 30 | 2.18 | 1.57 | 1.39 |
| P | 40 | 2.90 | 1.52 | 1.91 |

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:
1. A UV-curable coating comprising a filler-polymer composition comprising:
    at least one polymer, photoinitiator, and at least one filler, said filler comprising:
        a) a controlled amount of a dual phase filler having a silica phase and a carbon phase wherein said controlled amount is an amount selected from 1 wt % filler loading to 40 wt % filler loading, or b) a dual phase filler having a silica phase and a carbon phase, wherein said silica phase is a controlled surface coverage amount of the silica phase wherein said controlled surface coverage amount of the silica phase is from about 50% to about 99%, and wherein a higher controlled surface coverage amount provides a higher electrical resistivity in said coating, or c) a dual phase filler having a silica phase and a carbon phase, wherein said dual phase filler has a controlled morphology; or d) any combination of a), b), and c), wherein the coating has a surface resistivity of $10^6$ to $10^{16}$ Ohm/sq (ASTM D257-93), and wherein the dual phase filler of any of a), b), or c) contains a silica content of from 10 wt % to 90 wt %, based on weight of the dual phase filler, and the dual phase filler comprises fused primary particles with an average aggregate size of less than 250 nm and an average primary particle size of 45 nm or less, or the dual phase filler has less than 1% weight loss when subjected to the temperature from 120° C. up to 450° C. in air with a temperature ramp of 5 deg C. per minute.

2. The coating of claim 1, wherein the coating, after curing, is a black matrix, a black column spacer, or a component of a light shielding coating element in an LCD device.

3. The coating of claim 1, wherein electrical resistivity of said filler-polymer composition is maintained upon thermal processing or post-processing of said filler-polymer composition at temperatures up to thermal stability of said at least one polymer.

4. The coating of claim 1, wherein the coating has a dielectric constant of less than 20, an optical density of at least about 1 or more measured at a thickness of about 1 micron, or both.

5. The coating of claim 1, wherein said dual phase filler has attached at least one chemical group.

6. A UV-curable coating comprising a polymer composition which comprises at least one polymer, photoinitiator, and a dual phase filler having a silica phase and a carbon phase, wherein said dual phase filler has an exposed outer surface area, and said silica phase comprises from about 50% to about 99% by surface area of said exposed outer surface area, wherein the coating has a resistivity of $10^{10}$ to $10^{16}$ Ohm/sq (ASTM D257-93), a dielectric constant of less than 20, and an optical density of at least about 1 or more at a thickness of about 1 micron.

7. The coating of claim 6, wherein the coating, after curing, is a black matrix, a black column spacer, or a component of a light shielding element in an LCD device.

8. The coating of claim 6, wherein said dual phase filler has attached at least one chemical group.

9. A UV-curable coating comprising a polymer composition which comprises:
   a) at least one polymer;
   b) photoinitiator, and
   c) at least one dual phase filler having a silica phase, a carbon phase, and an exposed outer surface area, wherein said dual phase filler has an OAN between 50 cc/100 g to 200 cc/100 g filler (ASTM D2414), a silica content of 10 wt % to 90 wt %, and said silica phase comprises from about 50% to about 99% by surface area of said exposed outer surface area.

10. The coating of claim 9, wherein the coating, after curing, is a black matrix, a black column spacer, or a component of a light shielding element in LCD device.

11. A cured coating comprising a cured UV-curable coating of claim 9.

12. The coating of claim 9, wherein the coating has a surface resistivity of $10^{10}$ to $10^{16}$ Ohm/sq (ASTM D257-93), a dielectric constant of less than 20, an optical density of at least about 1 or more at a thickness of about 1 micron, or any combination of two or more of these.

13. The UV-curable coating of claim 9, wherein the electrical surface resistivity changes an order of magnitude of 2 or less over loading levels from 5 wt % to 35 wt % in the polymer composition.

* * * * *